US010808538B2

(12) United States Patent
Myers et al.

(10) Patent No.: US 10,808,538 B2
(45) Date of Patent: Oct. 20, 2020

(54) AIRFOIL SHAPE FOR TURBINE ROTOR BLADES

(71) Applicant: General Electric Company, Schenectady, NY (US)

(72) Inventors: Melbourne James Myers, Duncan, SC (US); Sylvain Pierre, Greer, SC (US); Michael Gordon Sherman, Taylors, SC (US); Luke C Sponseller, Greer, SC (US); Zhirui Dong, Simpsonville, SC (US); Le Trong Tran, Vancouver, WA (US)

(73) Assignee: General Electric Company, Schenectady, NY (US)

(*) Notice: Subject to any disclaimer, the term of this patent is extended or adjusted under 35 U.S.C. 154(b) by 343 days.

(21) Appl. No.: 16/176,275

(22) Filed: Oct. 31, 2018

(65) Prior Publication Data

US 2020/0131912 A1    Apr. 30, 2020

(51) Int. Cl.
*F01D 5/14* (2006.01)
*F02C 3/04* (2006.01)

(52) U.S. Cl.
CPC .............. *F01D 5/141* (2013.01); *F02C 3/04* (2013.01); *F05D 2220/3212* (2013.01); *F05D 2240/301* (2013.01)

(58) Field of Classification Search
CPC .... F01D 5/141; F02C 3/04; F05D 2220/3212; F05D 2240/301
See application file for complete search history.

(56) References Cited

U.S. PATENT DOCUMENTS

| | | |
|---|---|---|
| 6,503,054 B1 | 1/2003 | Bielek et al. |
| 6,685,434 B1 | 2/2004 | Humanchuk et al. |
| 6,736,599 B1 | 5/2004 | Jacks et al. |
| 6,739,838 B1 | 5/2004 | Bielek et al. |
| 6,779,980 B1 | 8/2004 | Brittingham et al. |
| 7,527,473 B2 | 5/2009 | Humanchuk et al. |
| 7,731,483 B2 | 6/2010 | DeLong et al. |
| 7,837,445 B2 | 11/2010 | Benjamin et al. |
| 8,070,428 B2 | 12/2011 | Bielek et al. |
| 8,133,016 B2 | 3/2012 | McGovern et al. |
| 8,133,030 B2 | 3/2012 | Grafitti et al. |
| 8,231,353 B2 | 7/2012 | Siden et al. |
| 8,313,291 B2 | 11/2012 | Mariotti et al. |
| 8,371,818 B2 | 2/2013 | Brittingham et al. |
| 8,807,950 B2 | 8/2014 | Bielek et al. |

(Continued)

*Primary Examiner* — Igor Kershteyn
(74) *Attorney, Agent, or Firm* — Charlotte C. Wilson; James W. Pemrick (57) ABSTRACT

A turbine rotor blade having an airfoil that includes a pressure side portion of a nominal airfoil profile substantially in accordance with Cartesian coordinate values of X, Y, and Z of a pressure side as set forth in Table I. The Cartesian coordinate values of X, Y, and Z are non-dimensional values from 0% to 100% convertible to dimensional distances by multiplying the Cartesian coordinate values of X, Y and Z by a height of the airfoil defined along the Z axis. The X and Y values of the pressure side are coordinate values that, when connected by smooth continuing arcs, define pressure side sections of the pressure side portion of the nominal airfoil profile at each Z coordinate value. The pressure side sections may be joined smoothly with one another to form the pressure side portion.

20 Claims, 2 Drawing Sheets

(56) References Cited

U.S. PATENT DOCUMENTS

| | | | |
|---|---|---|---|
| 8,814,511 B2 | 8/2014 | Check et al. | |
| 2004/0057833 A1* | 3/2004 | Arness | F01D 5/141 416/243 |
| 2005/0084372 A1* | 4/2005 | Zhang | F01D 5/141 416/116 |
| 2009/0035145 A1* | 2/2009 | DeLong | F01D 5/141 416/223 A |
| 2009/0035146 A1* | 2/2009 | Arness | F01D 5/142 416/223 R |
| 2013/0071249 A1* | 3/2013 | Collier | F01D 5/141 416/223 A |
| 2013/0136608 A1* | 5/2013 | Bielek | F01D 5/141 416/223 A |
| 2013/0136610 A1* | 5/2013 | Stein | F01D 5/141 416/223 A |
| 2013/0136611 A1* | 5/2013 | Gustafson | F01D 5/141 416/223 A |
| 2017/0226864 A1* | 8/2017 | Honkomp | F01D 5/143 |
| 2018/0016902 A1* | 1/2018 | Holloway | F01D 5/141 |

\* cited by examiner

AIRFOIL SHAPE FOR TURBINE ROTOR BLADES

BACKGROUND OF THE INVENTION

The subject matter disclosed herein relates to turbine engine airfoils and, more specifically, to airfoils of turbine rotor blades.

Some aircraft and/or power plant systems, for example certain jet aircraft, gas turbines, and combined cycle power plant systems, employ turbines (also referred to as turbomachines) in their design and operation. Some of these turbines employ airfoils (e.g., turbine rotor blades, blades, airfoils, etc.) which during operation are exposed to fluid flows. These airfoils are configured to aerodynamically interact with the fluid flows and generate energy (e.g., creating thrust, turning kinetic energy to mechanical energy, thermal energy to mechanical energy, etc.) from these fluid flows as part of power generation. As a result of this interaction and conversion, the aerodynamic characteristics and losses of these airfoils have an impact on system and turbine operation, performance, thrust, efficiency, and power.

BRIEF DESCRIPTION OF THE INVENTION

Aspects and advantages are set forth below in the following description, or may be obvious from the description, or may be learned through practice.

According to an exemplary embodiment, the present disclosure includes a turbine rotor blade having an airfoil that includes a pressure side portion of a nominal airfoil profile substantially in accordance with Cartesian coordinate values of X, Y, and Z of a pressure side as set forth in Table I. The Cartesian coordinate values of X, Y, and Z are non-dimensional values from 0% to 100% convertible to dimensional distances by multiplying the Cartesian coordinate values of X, Y and Z by a height of the airfoil defined along the Z axis. The X and Y values of the pressure side are coordinate values that, when connected by smooth continuing arcs, define pressure side sections of the pressure side portion of the nominal airfoil profile at each Z coordinate value. The pressure side sections may be joined smoothly with one another to form the pressure side portion.

According to another exemplary embodiment, the present disclosure includes a turbine rotor blade having an airfoil that includes a suction side portion of a nominal airfoil profile substantially in accordance with Cartesian coordinate values of X, Y, and Z of a suction side as set forth in Table I. The Cartesian coordinate values of X, Y, and Z are non-dimensional values from 0% to 100% convertible to dimensional distances by multiplying the Cartesian coordinate values of X, Y and Z by a height of the airfoil defined along the Z axis. The X and Y values of the suction side are coordinate values that, when connected by smooth continuing arcs, define suction side sections of the suction side portion of the nominal airfoil profile at each Z coordinate value. The suction side sections may be joined smoothly with one another to form the suction side portion.

According to another exemplary embodiment, the present disclosure includes a turbine engine that has an airfoil that includes: a pressure side portion of a nominal airfoil profile substantially in accordance with Cartesian coordinate values of X, Y, and Z of a pressure side as set forth in Table I; and a suction side portion of the nominal airfoil profile substantially in accordance with Cartesian coordinate values of X, Y, and Z of the suction side as set forth in Table I. The Cartesian coordinate values of X, Y, and Z are non-dimensional values from 0% to 100% convertible to dimensional distances by multiplying the Cartesian coordinate values of X, Y and Z by a height of the airfoil defined along the Z axis. The X and Y values of the pressure side are coordinate values that, when connected by smooth continuing arcs, define pressure side sections of the pressure side portion of the nominal airfoil profile at each Z coordinate value. The pressure side sections may be joined smoothly with one another to form the pressure side portion. The X and Y values of the suction side are coordinate values that, when connected by smooth continuing arcs, define suction side sections of the suction side portion of the nominal airfoil profile at each Z coordinate value. The suction side sections may be joined smoothly with one another to form the suction side portion.

Those of ordinary skill in the art will better appreciate the features and aspects of such embodiments, and others, upon review of the specification.

BRIEF DESCRIPTION OF THE DRAWINGS

A full and enabling disclosure of various embodiments, including the best mode thereof to one skilled in the art, is set forth more particularly in the remainder of the specification, including reference to the accompanying figures, in which.

DETAILED DESCRIPTION OF THE INVENTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Figure 1:
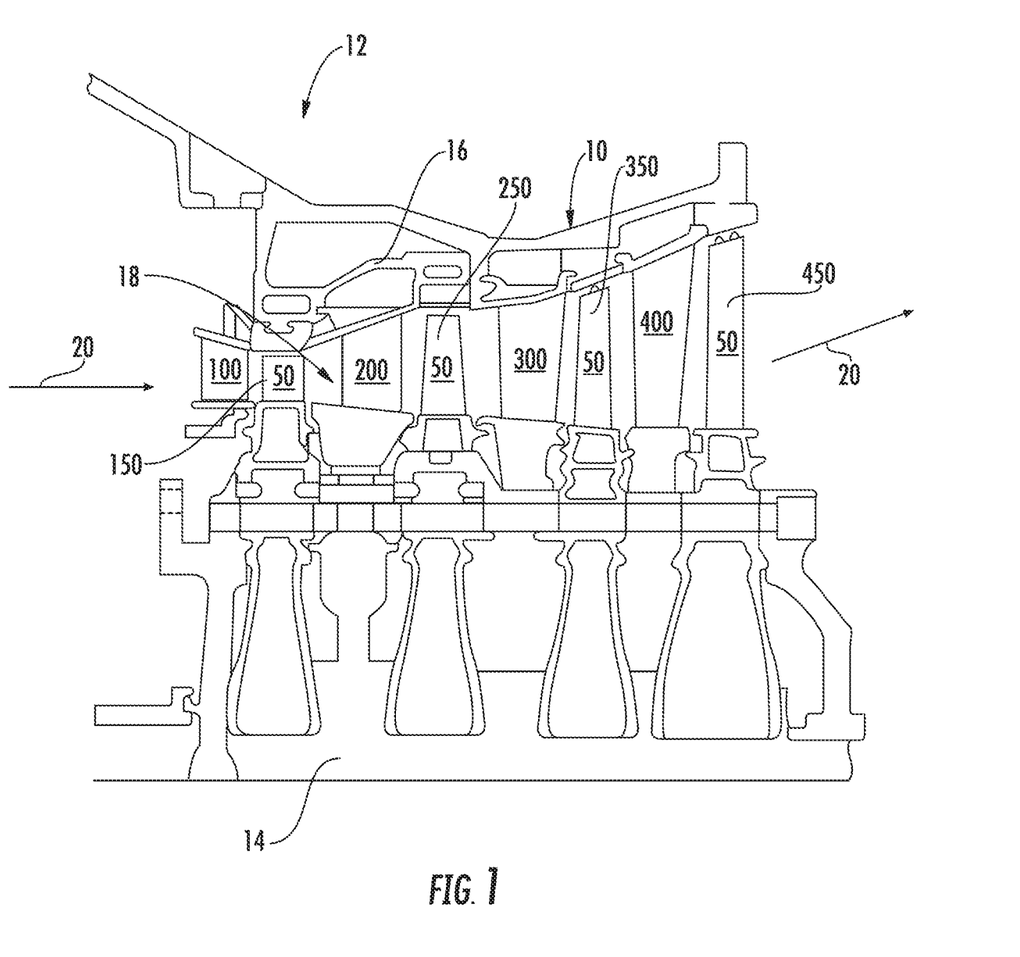
FIG. 1 is a schematic representation of an exemplary turbine having multiple stages with each stage including alternating rows of turbine rotor blades and stationary vanes or nozzles according to at least one embodiment of the present disclosure.

Referring now to the drawings, particularly to FIG. 1, there is illustrated an exemplary turbine 10 of a combustion or gas turbine 12 including a plurality of turbine stages arranged in serial flow order. Each stage of the turbine includes a row of turbine vanes or nozzles disposed axially adjacent to a corresponding row of turbine rotor blades. While four stages are illustrated in FIG. 1, the exact number of stages of the turbine 10 is a choice of engineering design, and may be more or less than the four stages shown. The four stages are merely exemplary of one turbine design, and are not intended to limit the presently claimed turbine rotor blade in any manner.

As depicted in FIG. 1, the first stage includes a plurality of turbine nozzles 100 and a plurality of turbine rotor blades 150. The turbine nozzles 100 are annularly arranged about an axis of a turbine rotor 14, while the turbine rotor blades 150 are annularly arranged about and coupled to the turbine rotor 14. A second stage of the turbine 12 includes a plurality of turbine nozzles 200 annularly arranged about the axis of the turbine rotor 14 and a plurality of turbine rotor blades 250 annularly arranged about and coupled to the turbine rotor 14. A third stage of the turbine 12 includes a plurality of turbine nozzles 300 annularly arranged about the axis of the turbine rotor 14 and a plurality of turbine rotor blades 350 annularly arranged about and coupled to the turbine rotor 14. In particular embodiments, the turbine 12 may further include a fourth stage, which also includes plurality of turbine nozzles 400 annularly arranged about the axis of the turbine rotor 14 and a plurality of turbine rotor blades 450 annularly arranged about and coupled to the turbine rotor 14. As will be appreciated, the turbine nozzles 100, 200, 300, 400 may be coupled to the casing 16 of the turbine 12 and remain stationary during operation.

It will be appreciated that the turbine nozzles 100, 200, 300 and 400 and turbine rotor blades 150, 250, 350 and 450 are disposed or at least partially disposed within a working fluid or hot gas path 18 of the turbine 12. The various stages of the turbine 10 at least partially define the hot gas path 18 through which combustion gases, as indicated by arrows 20, flow during operation of the gas turbine 12.

Figure 2:
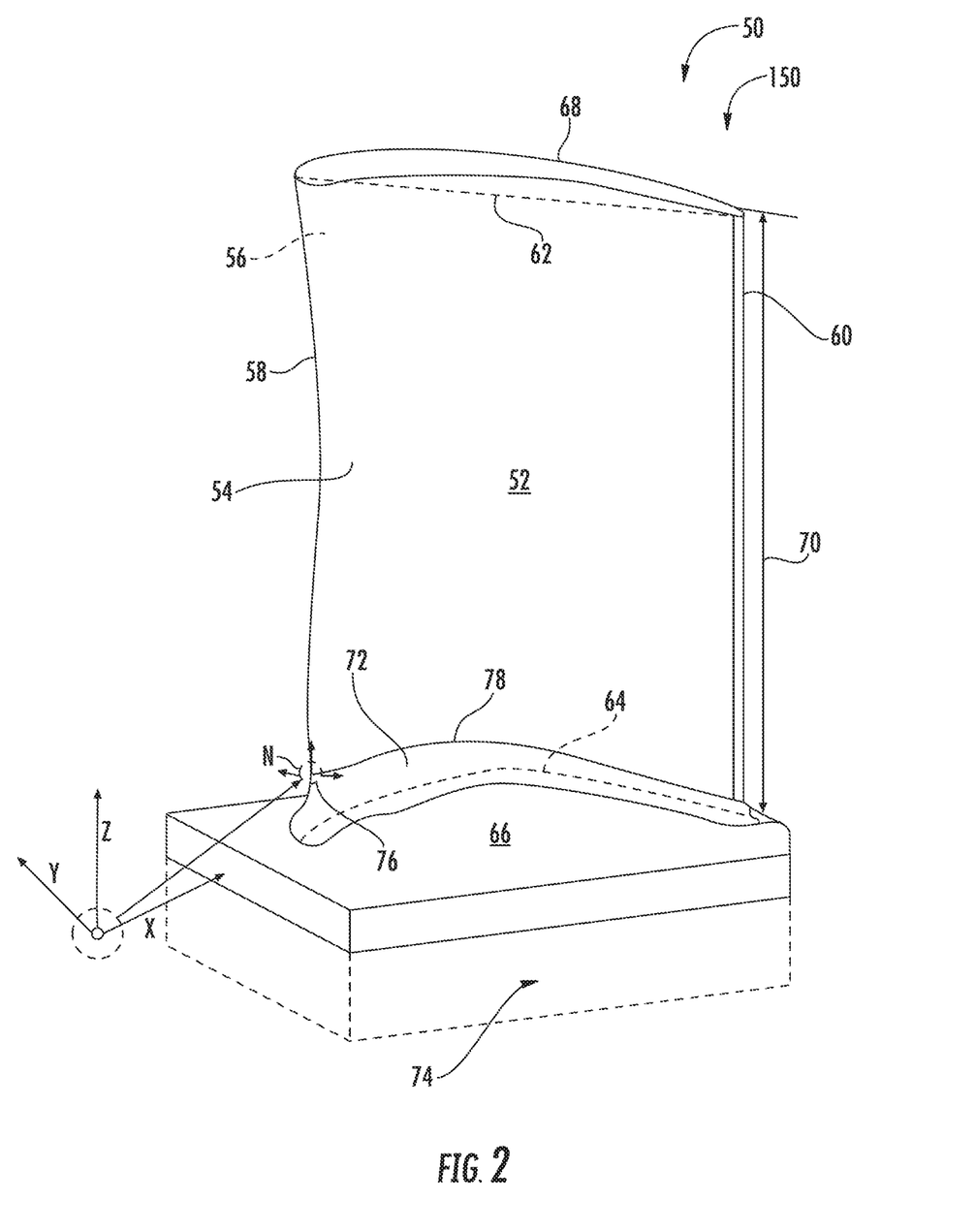
FIG. 2 is a perspective view of a turbine rotor blade according to at least one embodiment of the present disclosure.

FIG. 2 provides a perspective view of an exemplary turbine rotor blade 50, as may be incorporated in one of the stages of the turbine 12. In a preferred embodiment of the present disclosure, the turbine rotor blade 50 (as described by the points included within Table I below) is a turbine rotor blade 150 of the plurality of the turbine rotor blades 150 used in the first stage of the turbine 12, as shown in FIG. 1. As illustrated in FIG. 2, the turbine rotor blade 50 includes an airfoil 52 having a pressure side 54 and an opposing suction side 56. The pressure side 54 and the suction side 56 meet or intersect at a leading edge 58 and a trailing edge 60 of the airfoil 52. A chord line 62 extends between the leading edge 58 and the trailing edge 60 such that pressure and suction sides 54, 56 can be said to extend in chord or chordwise between the leading edge 58 and the trailing edge 60.

The airfoil 52 further includes a first end or root 64 which intersects with and extends radially outwardly from a base or platform 66 of the turbine rotor blade 50. The airfoil 52 terminates radially at a second end or radial tip 68 of the airfoil 52. The pressure and suction sides 54, 56 can be said to extend in span or in a span-wise direction 70 (along the height of the airfoil 52) between the root 64 and/or the platform 66 and the radial tip 68 of the airfoil 52. In other words, each turbine rotor blade 50 includes an airfoil 52 having opposing pressure and suction sides 54, 56 that extend in chord or chordwise 62 between opposing leading and trailing edges 58, 60 and that extend in span or span-wise 70 between the root 64 and the radial tip 68 of the airfoil 52.

In particular configurations, the airfoil 52 may include a fillet 72 formed between the platform 66 and the airfoil 52 proximate to the root 64. The fillet 72 can include a weld or braze fillet, which can be formed via conventional MIG welding, TIG welding, brazing, etc., and can include a profile that reduces fluid dynamic losses. In particular embodiments, the platform 66, airfoil 52 and the fillet 72 can be formed as a single component, such as by casting and/or machining and/or 3D printing and/or any other suitable technique now known or later developed and/or discovered. In particular configurations, the turbine rotor blade 50 includes a mounting portion 74 which is formed to connect and/or to secure the turbine rotor blade 50 to the rotor shaft 14.

The airfoil 52 of the turbine rotor blade 50 has a profile at any cross-section taken between the platform 66 or the root 64 and the radial tip 68. In accordance with the present disclosure, the X, Y, and Z values of the profile are given in Table I as percentage values of the airfoil span or height. As one example only, the height of the airfoil 52 of the rotor blade 50 may be from about 2 inches to about 50 inches. As another example, the height of the airfoil 52 of the rotor blade 50 may be from about 3 inches to about 10 inches. However, it is to be understood that heights below or above this range may also be employed as desired in the specific application.

A hot gas path of a gas turbine requires airfoils that meet system requirements of aerodynamic and mechanical blade loading and efficiency. To define the airfoil shape of each turbine rotor blade airfoil, there is a unique set or loci of points in space that meet the stage requirements and that can be manufactured. This unique loci of points meets the requirements for stage efficiency and are arrived at by iteration between aerodynamic and mechanical loadings enabling the turbine to run in an efficient, safe and smooth manner. These points are unique and specific to the system.

The loci that defines the airfoil profile of turbine rotor blade 50 includes a set of points with X, Y and Z dimensions relative to a reference origin coordinate system, as provided in Table I and shown in FIG. 2, respectively. The Cartesian coordinate system of X, Y and Z values given in Table I below defines the airfoil profile of the turbine rotor blade 50 at various locations along its length or span or, as used herein, height. Table I lists data for a non-coated airfoil, and, as discussed more below, the envelope/tolerance for the coordinates may be about +/−5% in a direction normal to any airfoil surface location and/or about +/−5% of the chord 62 in a direction nominal to any airfoil surface location. As shown in FIG. 2, the point data origin 76 is defined at or proximate to the root 64 at the leading edge 58 of the airfoil 52. In one embodiment, as presented in Table I below, the point data origin 76 is defined at or proximate to (above or below) a transition or intersection line 78 defined between the fillet 72 and the airfoil 52. The point data origin 76 corresponds to the non-dimensional Z value of Table I (presented below) at Z equals 0.

The coordinate values for the X, Y and Z coordinates are set forth in non-dimensionalized units in Table I, although units of dimensions may be used when the values are appropriately converted. That is, the X, Y, and Z values set forth in Table I are expressed in non-dimensional form (X, Y, and Z) from 0% to 100% of the radial span 70 or height of the airfoil. As one example, the Cartesian coordinate values of X, Y and Z may be convertible to dimensional distances by multiplying the X, Y and Z values by a height of the airfoil at the leading edge 58 and/or multiplying by a constant number. As another example, the Cartesian coordinate values of X, Y and Z may be convertible to dimensional distances by multiplying the X, Y and Z values by a height of the airfoil at the trailing edge 60 and/or multiplying by a constant number. Thus, to convert the Z value to a Z coordinate value, for example, in inches, the non-dimensional Z value given in Table I is multiplied by the height of the airfoil in inches.

As described above, the Cartesian coordinate system has orthogonally-related X, Y and Z axes, where the X axis lies generally parallel to a centerline of the rotor shaft 14, i.e., the rotary axis and a positive X coordinate value is axial toward an aft, i.e., exhaust end, of the turbine 10. The positive Y coordinate value extends tangentially in the direction of rotation of the rotor, and the positive Z coordinate value extends radially outwardly toward the radial tip 68 of the airfoil 52. All the values in Table I are given at room temperature and do not include the fillet 72.

By defining X and Y coordinate values at selected locations in a Z direction normal to the X, Y plane, the airfoil shape or profile sections (which may be referred to as "pressure side sections" on the pressure side and "suction side sections" on the suction side) of the airfoil 52 of the turbine rotor blade 50 along the span or height of the airfoil 52 can be ascertained. Thus, by connecting the X and Y values with smooth continuing arcs, each profile section (which may include a pressure side section and suction side section) at each distance Z is determined. The airfoil profiles of the various surface locations between the distances Z can then be determined by smoothly connecting the adjacent profile sections to one another to form the airfoil profile.

The Table I values are generated and shown to four decimal places for determining the profile of the airfoil. As the turbine rotor blade heats up during operation of the gas turbine, mechanical stresses and elevated temperatures will cause a change in the X, Y and Z values. Accordingly, it should be understood that the values for the nominal airfoil profile given in Table I represent ambient, non-operating or non-hot conditions (e.g., room temperature) and are for an uncoated airfoil.

There are typical manufacturing tolerances as well as coatings which may be accounted for in the actual profile of the airfoil 52. It will therefore be appreciated that +/-typical manufacturing tolerances, i.e., +/-values, including any coating thicknesses, may be additive to the X and Y values given in Table I below. Accordingly, a distance of +/-5% in a direction normal to any airfoil surface location and/or about +/-5% of the chord 62 in a direction nominal to any airfoil surface location may define an airfoil profile envelope for this particular airfoil design, i.e., a range of variation between measured points on the actual airfoil surface at nominal cold or room temperature and the ideal position of those points as given in Table I below at the same temperature. According to another example, a tolerance of about 10-20 percent of a thickness of the airfoil's trailing edge 60 in a direction normal to any airfoil surface location may define a range of variation between measured points on an actual airfoil surface and ideal positions as embodied by the invention in Table I. As should further be understood, the data provided in Table I is scalable and the geometry pertains to all aerodynamic scales and/or RPM ranges. The design of the airfoil 52 for the turbine rotor blade 50 is robust to this range of variation without impairment of mechanical and aerodynamic functions.

TABLE I

| SUCTION SIDE | | | PRESSURE SIDE | | |
|---|---|---|---|---|---|
| X (%) | Y (%) | Z (%) | X (%) | Y (%) | Z (%) |
| 0.0000 | 0.0000 | 0.0000 | 0.0000 | 0.0000 | 0.0000 |
| -0.5321 | 0.5897 | 0.0000 | 0.4882 | -0.3373 | 0.0000 |

TABLE I-continued

| SUCTION SIDE | | | PRESSURE SIDE | | |
|---|---|---|---|---|---|
| X (%) | Y (%) | Z (%) | X(%) | Y (%) | Z (%) |
| -0.8804 | 1.3055 | 0.0000 | 1.0285 | -0.5842 | 0.0000 |
| -0.9572 | 1.6963 | 0.0000 | 1.3165 | -0.6624 | 0.0000 |
| -1.0340 | 2.0872 | 0.0000 | 1.6045 | -0.7405 | 0.0000 |
| -0.9380 | 3.3159 | 0.0000 | 2.5205 | -0.8009 | 0.0000 |
| -0.6418 | 4.5199 | 0.0000 | 3.4311 | -0.6829 | 0.0000 |
| -0.2633 | 5.6992 | 0.0000 | 4.3307 | -0.4663 | 0.0000 |
| 0.1947 | 6.8484 | 0.0000 | 5.2110 | -0.1947 | 0.0000 |
| 0.7186 | 7.9702 | 0.0000 | 6.0805 | 0.1097 | 0.0000 |
| 1.3028 | 9.0590 | 0.0000 | 6.9417 | 0.4388 | 0.0000 |
| 1.9418 | 10.1204 | 0.0000 | 7.7946 | 0.7789 | 0.0000 |
| 2.6275 | 11.1516 | 0.0000 | 8.6476 | 1.1300 | 0.0000 |
| 3.3488 | 12.1555 | 0.0000 | 9.4978 | 1.4838 | 0.0000 |
| 4.1030 | 13.1291 | 0.0000 | 10.3508 | 1.8321 | 0.0000 |
| 4.8847 | 14.0781 | 0.0000 | 11.2038 | 2.1749 | 0.0000 |
| 5.6938 | 14.9996 | 0.0000 | 12.0649 | 2.5068 | 0.0000 |
| 6.5303 | 15.8910 | 0.0000 | 12.9261 | 2.8277 | 0.0000 |
| 7.3942 | 16.7549 | 0.0000 | 13.7956 | 3.1321 | 0.0000 |
| 8.2883 | 17.5887 | 0.0000 | 14.6705 | 3.4228 | 0.0000 |
| 9.2098 | 18.3950 | 0.0000 | 15.5481 | 3.6971 | 0.0000 |
| 10.1615 | 19.1739 | 0.0000 | 16.4340 | 3.9522 | 0.0000 |
| 11.1434 | 19.9199 | 0.0000 | 17.3254 | 4.1880 | 0.0000 |
| 12.1527 | 20.6357 | 0.0000 | 18.2195 | 4.4047 | 0.0000 |
| 13.1867 | 21.3104 | 0.0000 | 19.1191 | 4.5994 | 0.0000 |
| 14.2399 | 21.9495 | 0.0000 | 20.0241 | 4.7722 | 0.0000 |
| 15.3150 | 22.5419 | 0.0000 | 20.9320 | 4.9231 | 0.0000 |
| 16.4093 | 23.0904 | 0.0000 | 21.8453 | 5.0465 | 0.0000 |
| 17.5283 | 23.5951 | 0.0000 | 22.7586 | 5.1452 | 0.0000 |
| 18.6747 | 24.0476 | 0.0000 | 23.6774 | 5.2165 | 0.0000 |
| 19.8486 | 24.4480 | 0.0000 | 24.5989 | 5.2632 | 0.0000 |
| 21.0389 | 24.7881 | 0.0000 | 25.5177 | 5.2796 | 0.0000 |
| 22.2457 | 25.0624 | 0.0000 | 26.4392 | 5.2659 | 0.0000 |
| 23.4552 | 25.2708 | 0.0000 | 27.3580 | 5.2275 | 0.0000 |
| 24.6784 | 25.4107 | 0.0000 | 28.2768 | 5.1589 | 0.0000 |
| 25.9126 | 25.4711 | 0.0000 | 29.1928 | 5.0602 | 0.0000 |
| 27.1550 | 25.4573 | 0.0000 | 30.1061 | 4.9368 | 0.0000 |
| 28.3892 | 25.3668 | 0.0000 | 31.0140 | 4.7832 | 0.0000 |
| 29.6125 | 25.1995 | 0.0000 | 31.9163 | 4.6049 | 0.0000 |
| 30.8192 | 24.9609 | 0.0000 | 32.8131 | 4.3965 | 0.0000 |
| 32.0095 | 24.6510 | 0.0000 | 33.7045 | 4.1634 | 0.0000 |
| 33.1861 | 24.2698 | 0.0000 | 34.5876 | 3.9028 | 0.0000 |
| 34.3435 | 23.8172 | 0.0000 | 35.4625 | 3.6148 | 0.0000 |
| 35.4735 | 23.3071 | 0.0000 | 36.3292 | 3.3022 | 0.0000 |
| 36.5678 | 22.7449 | 0.0000 | 37.1849 | 2.9676 | 0.0000 |
| 37.6320 | 22.1305 | 0.0000 | 38.0324 | 2.6055 | 0.0000 |
| 38.6687 | 21.4723 | 0.0000 | 38.8689 | 2.2216 | 0.0000 |
| 39.6808 | 20.7674 | 0.0000 | 39.6945 | 1.8129 | 0.0000 |
| 40.6681 | 20.0214 | 0.0000 | 40.5090 | 1.3823 | 0.0000 |
| 41.6280 | 19.2397 | 0.0000 | 41.3126 | 0.9325 | 0.0000 |
| 42.5633 | 18.4279 | 0.0000 | 42.1053 | 0.4635 | 0.0000 |
| 43.4684 | 17.5887 | 0.0000 | 42.8842 | -0.0274 | 0.0000 |
| 44.3515 | 16.7275 | 0.0000 | 43.6521 | -0.5348 | 0.0000 |
| 45.2100 | 15.8471 | 0.0000 | 44.4064 | -1.0614 | 0.0000 |
| 46.0465 | 14.9420 | 0.0000 | 45.1496 | -1.6072 | 0.0000 |
| 46.8638 | 14.0177 | 0.0000 | 45.8819 | -2.1667 | 0.0000 |
| 47.6619 | 13.0770 | 0.0000 | 46.6005 | -2.7427 | 0.0000 |
| 48.4408 | 12.1171 | 0.0000 | 47.3053 | -3.3323 | 0.0000 |
| 49.2033 | 11.1434 | 0.0000 | 47.9992 | -3.9385 | 0.0000 |
| 49.9493 | 10.1561 | 0.0000 | 48.6794 | -4.5583 | 0.0000 |
| 50.6788 | 9.1605 | 0.0000 | 49.3486 | -5.1918 | 0.0000 |
| 51.3919 | 8.1539 | 0.0000 | 50.0069 | -5.8364 | 0.0000 |
| 52.0913 | 7.1419 | 0.0000 | 50.6514 | -6.4946 | 0.0000 |
| 52.7797 | 6.1189 | 0.0000 | 51.2849 | -7.1638 | 0.0000 |
| 53.4516 | 5.0876 | 0.0000 | 51.9075 | -7.8440 | 0.0000 |
| 54.1126 | 4.0509 | 0.0000 | 52.5164 | -8.5324 | 0.0000 |
| 54.7626 | 3.0060 | 0.0000 | 53.1143 | -9.2345 | 0.0000 |
| 55.4044 | 1.9528 | 0.0000 | 53.7012 | -9.9449 | 0.0000 |
| 56.0325 | 0.8968 | 0.0000 | 54.2772 | -10.6607 | 0.0000 |
| 56.6496 | -0.1700 | 0.0000 | 54.8422 | -11.3875 | 0.0000 |
| 57.2584 | -1.2397 | 0.0000 | 55.3962 | -12.1225 | 0.0000 |
| 57.8536 | -2.3175 | 0.0000 | 55.9420 | -12.8658 | 0.0000 |
| 58.4405 | -3.4036 | 0.0000 | 56.4795 | -13.6145 | 0.0000 |
| 59.0165 | -4.4925 | 0.0000 | 57.0061 | -14.3688 | 0.0000 |
| 59.5815 | -5.5895 | 0.0000 | 57.5245 | -15.1285 | 0.0000 |
| 60.1410 | -6.6893 | 0.0000 | 58.0374 | -15.8964 | 0.0000 |
| 60.6895 | -7.7946 | 0.0000 | 58.5393 | -16.6671 | 0.0000 |

TABLE I-continued

| SUCTION SIDE | | | PRESSURE SIDE | | |
|---|---|---|---|---|---|
| X (%) | Y (%) | Z (%) | X (%) | Y (%) | Z (%) |
| 61.2325 | −8.9054 | 0.0000 | 59.0357 | −17.4433 | 0.0000 |
| 61.7674 | −10.0189 | 0.0000 | 59.5239 | −18.2250 | 0.0000 |
| 62.2912 | −11.1352 | 0.0000 | 60.0038 | −19.0094 | 0.0000 |
| 62.8068 | −12.2569 | 0.0000 | 60.4756 | −19.7992 | 0.0000 |
| 63.3115 | −13.3814 | 0.0000 | 60.9418 | −20.5946 | 0.0000 |
| 63.8052 | −14.5114 | 0.0000 | 61.3999 | −21.3927 | 0.0000 |
| 64.2851 | −15.6441 | 0.0000 | 61.8496 | −22.1963 | 0.0000 |
| 64.7569 | −16.7823 | 0.0000 | 62.2885 | −23.0027 | 0.0000 |
| 65.2204 | −17.9260 | 0.0000 | 62.7218 | −23.8172 | 0.0000 |
| 65.6757 | −19.0724 | 0.0000 | 63.1442 | −24.6373 | 0.0000 |
| 66.1254 | −20.2189 | 0.0000 | 63.5556 | −25.4601 | 0.0000 |
| 66.5698 | −21.3708 | 0.0000 | 63.9588 | −26.2884 | 0.0000 |
| 67.0058 | −22.5254 | 0.0000 | 64.3537 | −27.1194 | 0.0000 |
| 67.4337 | −23.6828 | 0.0000 | 64.7432 | −27.9532 | 0.0000 |
| 67.8561 | −24.8430 | 0.0000 | 65.1216 | −28.7924 | 0.0000 |
| 68.2702 | −26.0031 | 0.0000 | 65.4919 | −29.6344 | 0.0000 |
| 68.6871 | −27.1633 | 0.0000 | 65.8567 | −30.4819 | 0.0000 |
| 69.1122 | −28.3234 | 0.0000 | 66.2242 | −31.3294 | 0.0000 |
| 69.5510 | −29.4781 | 0.0000 | 66.6219 | −32.1631 | 0.0000 |
| 69.9871 | −30.6355 | 0.0000 | 67.1018 | −32.9558 | 0.0000 |
| 70.3245 | −31.8176 | 0.0000 | 67.7244 | −33.6359 | 0.0000 |
| 70.2833 | −33.0298 | 0.0000 | 68.5417 | −34.0062 | 0.0000 |
| 69.4358 | −33.9047 | 0.0000 | 69.4358 | −33.9047 | 0.0000 |
| 1.3988 | 1.1903 | 9.9997 | 1.3988 | 1.1903 | 9.9997 |
| 0.8365 | 1.7471 | 9.9997 | 1.8952 | 0.8804 | 9.9997 |
| 0.4388 | 2.4300 | 9.9997 | 2.4355 | 0.6528 | 9.9997 |
| 0.3319 | 2.8099 | 9.9997 | 2.7193 | 0.5814 | 9.9997 |
| 0.2249 | 3.1897 | 9.9997 | 3.0032 | 0.5101 | 9.9997 |
| 0.2276 | 4.4157 | 9.9997 | 3.9083 | 0.4635 | 9.9997 |
| 0.4498 | 5.6252 | 9.9997 | 4.8024 | 0.5979 | 9.9997 |
| 0.7679 | 6.8128 | 9.9997 | 5.6773 | 0.8475 | 9.9997 |
| 1.1684 | 7.9784 | 9.9997 | 6.5303 | 1.1656 | 9.9997 |
| 1.6401 | 9.1111 | 9.9997 | 7.3668 | 1.5167 | 9.9997 |
| 2.1694 | 10.2137 | 9.9997 | 8.1951 | 1.8869 | 9.9997 |
| 2.7564 | 11.2805 | 9.9997 | 9.0206 | 2.2654 | 9.9997 |
| 3.3899 | 12.3200 | 9.9997 | 9.8407 | 2.6521 | 9.9997 |
| 4.0728 | 13.3348 | 9.9997 | 10.6634 | 3.0361 | 9.9997 |
| 4.7942 | 14.3222 | 9.9997 | 11.4862 | 3.4174 | 9.9997 |
| 5.5511 | 15.2848 | 9.9997 | 12.3173 | 3.7849 | 9.9997 |
| 6.3410 | 16.2146 | 9.9997 | 13.1538 | 4.1359 | 9.9997 |
| 7.1611 | 17.1114 | 9.9997 | 13.9985 | 4.4678 | 9.9997 |
| 8.0113 | 17.9781 | 9.9997 | 14.8515 | 4.7750 | 9.9997 |
| 8.8889 | 18.8091 | 9.9997 | 15.7127 | 5.0602 | 9.9997 |
| 9.7968 | 19.6127 | 9.9997 | 16.5821 | 5.3235 | 9.9997 |
| 10.7348 | 20.3807 | 9.9997 | 17.4570 | 5.5621 | 9.9997 |
| 11.7084 | 21.1157 | 9.9997 | 18.3401 | 5.7733 | 9.9997 |
| 12.7122 | 21.8151 | 9.9997 | 19.2288 | 5.9543 | 9.9997 |
| 13.7435 | 22.4733 | 9.9997 | 20.1229 | 6.1106 | 9.9997 |
| 14.8021 | 23.0849 | 9.9997 | 21.0197 | 6.2368 | 9.9997 |
| 15.8800 | 23.6472 | 9.9997 | 21.9221 | 6.3355 | 9.9997 |
| 16.9825 | 24.1573 | 9.9997 | 22.8271 | 6.4041 | 9.9997 |
| 18.1070 | 24.6153 | 9.9997 | 23.7349 | 6.4398 | 9.9997 |
| 19.2589 | 25.0158 | 9.9997 | 24.6428 | 6.4480 | 9.9997 |
| 20.4383 | 25.3586 | 9.9997 | 25.5478 | 6.4206 | 9.9997 |
| 21.6341 | 25.6329 | 9.9997 | 26.4557 | 6.3657 | 9.9997 |
| 22.8381 | 25.8386 | 9.9997 | 27.3580 | 6.2779 | 9.9997 |
| 24.0449 | 25.9702 | 9.9997 | 28.2576 | 6.1600 | 9.9997 |
| 25.2599 | 26.0251 | 9.9997 | 29.1544 | 6.0146 | 9.9997 |
| 26.4858 | 26.0031 | 9.9997 | 30.0431 | 5.8419 | 9.9997 |
| 27.7091 | 25.8989 | 9.9997 | 30.9289 | 5.6389 | 9.9997 |
| 28.9213 | 25.7179 | 9.9997 | 31.8066 | 5.4140 | 9.9997 |
| 30.1144 | 25.4601 | 9.9997 | 32.6788 | 5.1617 | 9.9997 |
| 31.2855 | 25.1337 | 9.9997 | 33.5427 | 4.8847 | 9.9997 |
| 32.4429 | 24.7388 | 9.9997 | 34.3984 | 4.5830 | 9.9997 |
| 33.5783 | 24.2753 | 9.9997 | 35.2459 | 4.2593 | 9.9997 |
| 34.6891 | 23.7514 | 9.9997 | 36.0851 | 3.9138 | 9.9997 |
| 35.7642 | 23.1754 | 9.9997 | 36.9162 | 3.5463 | 9.9997 |
| 36.8065 | 22.5529 | 9.9997 | 37.7362 | 3.1595 | 9.9997 |
| 37.8157 | 21.8919 | 9.9997 | 38.5480 | 2.7509 | 9.9997 |
| 38.8031 | 21.1870 | 9.9997 | 39.3462 | 2.3230 | 9.9997 |
| 39.7630 | 20.4492 | 9.9997 | 40.1360 | 1.8760 | 9.9997 |
| 40.7010 | 19.6758 | 9.9997 | 40.9177 | 1.4125 | 9.9997 |
| 41.6143 | 18.8722 | 9.9997 | 41.6856 | 0.9298 | 9.9997 |
| 42.5084 | 18.0385 | 9.9997 | 42.4426 | 0.4333 | 9.9997 |
| 43.3806 | 17.1827 | 9.9997 | 43.1914 | −0.0823 | 9.9997 |
| 44.2308 | 16.3051 | 9.9997 | 43.9291 | −0.6116 | 9.9997 |
| 45.0618 | 15.4110 | 9.9997 | 44.6532 | −1.1574 | 9.9997 |
| 45.8737 | 14.5004 | 9.9997 | 45.3690 | −1.7169 | 9.9997 |
| 46.6636 | 13.5734 | 9.9997 | 46.0739 | −2.2874 | 9.9997 |
| 47.4397 | 12.6327 | 9.9997 | 46.7650 | −2.8743 | 9.9997 |
| 48.1994 | 11.6782 | 9.9997 | 47.4480 | −3.4722 | 9.9997 |
| 48.9427 | 10.7073 | 9.9997 | 48.1199 | −4.0838 | 9.9997 |
| 49.6750 | 9.7282 | 9.9997 | 48.7781 | −4.7064 | 9.9997 |
| 50.3908 | 8.7408 | 9.9997 | 49.4282 | −5.3400 | 9.9997 |
| 51.0957 | 7.7453 | 9.9997 | 50.0672 | −5.9845 | 9.9997 |
| 51.7868 | 6.7414 | 9.9997 | 50.6953 | −6.6400 | 9.9997 |
| 52.4670 | 5.7322 | 9.9997 | 51.3151 | −7.3037 | 9.9997 |
| 53.1335 | 4.7146 | 9.9997 | 51.9212 | −7.9784 | 9.9997 |
| 53.7917 | 3.6944 | 9.9997 | 52.5191 | −8.6586 | 9.9997 |
| 54.4390 | 2.6659 | 9.9997 | 53.1088 | −9.3497 | 9.9997 |
| 55.0753 | 1.6319 | 9.9997 | 53.6875 | −10.0518 | 9.9997 |
| 55.7006 | 0.5897 | 9.9997 | 54.2552 | −10.7594 | 9.9997 |
| 56.3177 | −0.4553 | 9.9997 | 54.8120 | −11.4753 | 9.9997 |
| 56.9238 | −1.5057 | 9.9997 | 55.3578 | −12.1993 | 9.9997 |
| 57.5217 | −2.5644 | 9.9997 | 55.8953 | −12.9289 | 9.9997 |
| 58.1087 | −3.6258 | 9.9997 | 56.4247 | −13.6667 | 9.9997 |
| 58.6846 | −4.6954 | 9.9997 | 56.9430 | −14.4099 | 9.9997 |
| 59.2524 | −5.7678 | 9.9997 | 57.4559 | −15.1614 | 9.9997 |
| 59.8119 | −6.8457 | 9.9997 | 57.9606 | −15.9129 | 9.9997 |
| 60.3604 | −7.9263 | 9.9997 | 58.4597 | −16.6726 | 9.9997 |
| 60.9034 | −9.0151 | 9.9997 | 58.9507 | −17.4351 | 9.9997 |
| 61.4382 | −10.1067 | 9.9997 | 59.4361 | −18.2030 | 9.9997 |
| 61.9648 | −11.2038 | 9.9997 | 59.9133 | −18.9737 | 9.9997 |
| 62.4832 | −12.3063 | 9.9997 | 60.3823 | −19.7499 | 9.9997 |
| 62.9933 | −13.4143 | 9.9997 | 60.8431 | −20.5315 | 9.9997 |
| 63.4925 | −14.5279 | 9.9997 | 61.2929 | −21.3214 | 9.9997 |
| 63.9779 | −15.6441 | 9.9997 | 61.7345 | −22.1140 | 9.9997 |
| 64.4552 | −16.7659 | 9.9997 | 62.1651 | −22.9122 | 9.9997 |
| 64.9214 | −17.8931 | 9.9997 | 62.5847 | −23.7158 | 9.9997 |
| 65.3767 | −19.0258 | 9.9997 | 62.9933 | −24.5276 | 9.9997 |
| 65.8265 | −20.1585 | 9.9997 | 63.3938 | −25.3421 | 9.9997 |
| 66.2708 | −21.2940 | 9.9997 | 63.7832 | −26.1595 | 9.9997 |
| 66.7124 | −22.4349 | 9.9997 | 64.1644 | −26.9823 | 9.9997 |
| 67.1485 | −23.5731 | 9.9997 | 64.5402 | −27.8078 | 9.9997 |
| 67.5791 | −24.7168 | 9.9997 | 64.9132 | −28.6361 | 9.9997 |
| 68.0042 | −25.8578 | 9.9997 | 65.2835 | −29.4644 | 9.9997 |
| 68.4238 | −27.0015 | 9.9997 | 65.6537 | −30.2926 | 9.9997 |
| 68.8407 | −28.1451 | 9.9997 | 66.0377 | −31.1154 | 9.9997 |
| 69.2713 | −29.2861 | 9.9997 | 66.4573 | −31.9245 | 9.9997 |
| 69.7238 | −30.4270 | 9.9997 | 66.9510 | −32.6925 | 9.9997 |
| 70.1050 | −31.5844 | 9.9997 | 67.5873 | −33.3452 | 9.9997 |
| 70.0831 | −32.7802 | 9.9997 | 68.3991 | −33.7292 | 9.9997 |
| 69.2768 | −33.6579 | 9.9997 | 69.2768 | −33.6579 | 9.9997 |
| 2.3642 | 2.2572 | 19.9995 | 2.3642 | 2.2572 | 19.9995 |
| 1.8047 | 2.8057 | 19.9995 | 2.8524 | 1.9473 | 19.9995 |
| 1.4015 | 3.4749 | 19.9995 | 3.3817 | 1.7114 | 19.9995 |
| 1.2890 | 3.8493 | 19.9995 | 3.6614 | 1.6291 | 19.9995 |
| 1.1766 | 4.2237 | 19.9995 | 3.9412 | 1.5469 | 19.9995 |
| 1.1492 | 5.4359 | 19.9995 | 4.8326 | 1.4481 | 19.9995 |
| 1.3302 | 6.6400 | 19.9995 | 5.7239 | 1.5304 | 19.9995 |
| 1.6154 | 7.8248 | 19.9995 | 6.5906 | 1.7498 | 19.9995 |
| 1.9857 | 8.9849 | 19.9995 | 7.4353 | 2.0652 | 19.9995 |
| 2.4218 | 10.1204 | 19.9995 | 8.2581 | 2.4300 | 19.9995 |
| 2.9127 | 11.2230 | 19.9995 | 9.0672 | 2.8249 | 19.9995 |
| 3.4585 | 12.2953 | 19.9995 | 9.8681 | 3.2281 | 19.9995 |
| 4.0509 | 13.3375 | 19.9995 | 10.6634 | 3.6422 | 19.9995 |
| 4.6872 | 14.3523 | 19.9995 | 11.4561 | 4.0619 | 19.9995 |
| 5.3674 | 15.3397 | 19.9995 | 12.2514 | 4.4788 | 19.9995 |
| 6.0860 | 16.3051 | 19.9995 | 13.0578 | 4.8792 | 19.9995 |
| 6.8484 | 17.2458 | 19.9995 | 13.8724 | 5.2577 | 19.9995 |
| 7.6465 | 18.1536 | 19.9995 | 14.6979 | 5.6060 | 19.9995 |
| 8.4803 | 19.0286 | 19.9995 | 15.5344 | 5.9324 | 19.9995 |
| 9.3442 | 19.8651 | 19.9995 | 16.3819 | 6.2313 | 19.9995 |
| 10.2411 | 20.6604 | 19.9995 | 17.2376 | 6.5028 | 19.9995 |
| 11.1681 | 21.4201 | 19.9995 | 18.1043 | 6.7442 | 19.9995 |
| 12.1280 | 22.1387 | 19.9995 | 18.9764 | 6.9526 | 19.9995 |
| 13.1264 | 22.8162 | 19.9995 | 19.8568 | 7.1254 | 19.9995 |
| 14.1576 | 23.4525 | 19.9995 | 20.7455 | 7.2653 | 19.9995 |
| 15.2190 | 24.0366 | 19.9995 | 21.6368 | 7.3723 | 19.9995 |
| 16.3051 | 24.5660 | 19.9995 | 22.5309 | 7.4436 | 19.9995 |
| 17.4131 | 25.0405 | 19.9995 | 23.4278 | 7.4820 | 19.9995 |
| 18.5486 | 25.4546 | 19.9995 | 24.3274 | 7.4847 | 19.9995 |

TABLE I-continued

| SUCTION SIDE | | | PRESSURE SIDE | | |
|---|---|---|---|---|---|
| X (%) | Y (%) | Z (%) | X (%) | Y (%) | Z (%) |
| 19.7060 | 25.8029 | 19.9995 | 25.2242 | 7.4518 | 19.9995 |
| 20.8881 | 26.0854 | 19.9995 | 26.1183 | 7.3860 | 19.9995 |
| 22.0784 | 26.2966 | 19.9995 | 27.0124 | 7.2872 | 19.9995 |
| 23.2714 | 26.4337 | 19.9995 | 27.9010 | 7.1556 | 19.9995 |
| 24.4700 | 26.4941 | 19.9995 | 28.7842 | 6.9910 | 19.9995 |
| 25.6768 | 26.4776 | 19.9995 | 29.6591 | 6.7990 | 19.9995 |
| 26.8863 | 26.3816 | 19.9995 | 30.5313 | 6.5796 | 19.9995 |
| 28.0875 | 26.2061 | 19.9995 | 31.3952 | 6.3328 | 19.9995 |
| 29.2669 | 25.9565 | 19.9995 | 32.2509 | 6.0613 | 19.9995 |
| 30.4243 | 25.6356 | 19.9995 | 33.0984 | 5.7651 | 19.9995 |
| 31.5652 | 25.2462 | 19.9995 | 33.9376 | 5.4469 | 19.9995 |
| 32.6870 | 24.7936 | 19.9995 | 34.7687 | 5.1041 | 19.9995 |
| 33.7868 | 24.2807 | 19.9995 | 35.5887 | 4.7421 | 19.9995 |
| 34.8509 | 23.7130 | 19.9995 | 36.4005 | 4.3581 | 19.9995 |
| 35.8849 | 23.1041 | 19.9995 | 37.2041 | 3.9577 | 19.9995 |
| 36.8832 | 22.4514 | 19.9995 | 37.9968 | 3.5353 | 19.9995 |
| 37.8596 | 21.7602 | 19.9995 | 38.7812 | 3.0956 | 19.9995 |
| 38.8058 | 21.0334 | 19.9995 | 39.5546 | 2.6412 | 19.9995 |
| 39.7329 | 20.2765 | 19.9995 | 40.3171 | 2.1694 | 19.9995 |
| 40.6352 | 19.4893 | 19.9995 | 41.0713 | 1.6812 | 19.9995 |
| 41.5183 | 18.6720 | 19.9995 | 41.8145 | 1.1766 | 19.9995 |
| 42.3795 | 17.8328 | 19.9995 | 42.5496 | 0.6610 | 19.9995 |
| 43.2243 | 16.9688 | 19.9995 | 43.2736 | 0.1289 | 19.9995 |
| 44.0498 | 16.0912 | 19.9995 | 43.9867 | −0.4169 | 19.9995 |
| 44.8561 | 15.1971 | 19.9995 | 44.6888 | −0.9764 | 19.9995 |
| 45.6433 | 14.2865 | 19.9995 | 45.3827 | −1.5469 | 19.9995 |
| 46.4140 | 13.3650 | 19.9995 | 46.0657 | −2.1283 | 19.9995 |
| 47.1682 | 12.4270 | 19.9995 | 46.7404 | −2.7207 | 19.9995 |
| 47.9115 | 11.4780 | 19.9995 | 47.4041 | −3.3268 | 19.9995 |
| 48.6383 | 10.5181 | 19.9995 | 48.0596 | −3.9412 | 19.9995 |
| 49.3541 | 9.5499 | 19.9995 | 48.7041 | −4.5665 | 19.9995 |
| 50.0590 | 8.5708 | 19.9995 | 49.3376 | −5.2001 | 19.9995 |
| 50.7501 | 7.5862 | 19.9995 | 49.9657 | −5.8446 | 19.9995 |
| 51.4330 | 6.5933 | 19.9995 | 50.5801 | −6.4974 | 19.9995 |
| 52.1022 | 5.5950 | 19.9995 | 51.1862 | −7.1611 | 19.9995 |
| 52.7632 | 4.5912 | 19.9995 | 51.7841 | −7.8303 | 19.9995 |
| 53.4132 | 3.5847 | 19.9995 | 52.3738 | −8.5105 | 19.9995 |
| 54.0550 | 2.5699 | 19.9995 | 52.9497 | −9.1961 | 19.9995 |
| 54.6858 | 1.5496 | 19.9995 | 53.5202 | −9.8900 | 19.9995 |
| 55.3084 | 0.5266 | 19.9995 | 54.0797 | −10.5921 | 19.9995 |
| 55.9228 | −0.5046 | 19.9995 | 54.6310 | −11.2997 | 19.9995 |
| 56.5262 | −1.5414 | 19.9995 | 55.1740 | −12.0156 | 19.9995 |
| 57.1213 | −2.5808 | 19.9995 | 55.7088 | −12.7396 | 19.9995 |
| 57.7055 | −3.6258 | 19.9995 | 56.2354 | −13.4664 | 19.9995 |
| 58.2815 | −4.6762 | 19.9995 | 56.7510 | −14.2015 | 19.9995 |
| 58.8492 | −5.7322 | 19.9995 | 57.2612 | −14.9393 | 19.9995 |
| 59.4059 | −6.7936 | 19.9995 | 57.7631 | −15.6825 | 19.9995 |
| 59.9572 | −7.8577 | 19.9995 | 58.2595 | −16.4340 | 19.9995 |
| 60.5003 | −8.9246 | 19.9995 | 58.7477 | −17.1882 | 19.9995 |
| 61.0378 | −9.9997 | 19.9995 | 59.2277 | −17.9452 | 19.9995 |
| 61.5672 | −11.0776 | 19.9995 | 59.7021 | −18.7077 | 19.9995 |
| 62.0855 | −12.1609 | 19.9995 | 60.1711 | −19.4729 | 19.9995 |
| 62.5957 | −13.2498 | 19.9995 | 60.6319 | −20.2435 | 19.9995 |
| 63.0948 | −14.3441 | 19.9995 | 61.0844 | −21.0107 | 19.9995 |
| 63.5857 | −15.4412 | 19.9995 | 61.5260 | −21.8014 | 19.9995 |
| 64.0630 | −16.5464 | 19.9995 | 61.9621 | −22.5858 | 19.9995 |
| 64.5292 | −17.6572 | 19.9995 | 62.3845 | −23.3784 | 19.9995 |
| 64.9900 | −18.7680 | 19.9995 | 62.7959 | −24.1765 | 19.9995 |
| 65.4453 | −19.8843 | 19.9995 | 63.1963 | −24.9801 | 19.9995 |
| 65.8951 | −21.0033 | 19.9995 | 63.5857 | −25.7919 | 19.9995 |
| 66.3421 | −22.1250 | 19.9995 | 63.9642 | −26.6038 | 19.9995 |
| 66.7837 | −23.2468 | 19.9995 | 64.3345 | −27.4211 | 19.9995 |
| 67.2198 | −24.3685 | 19.9995 | 64.6993 | −28.2411 | 19.9995 |
| 67.6476 | −25.4930 | 19.9995 | 65.0586 | −29.0639 | 19.9995 |
| 68.0727 | −26.6202 | 19.9995 | 65.4206 | −29.8867 | 19.9995 |
| 68.4951 | −27.7447 | 19.9995 | 65.7991 | −30.7040 | 19.9995 |
| 68.9312 | −28.8692 | 19.9995 | 66.2187 | −31.5022 | 19.9995 |
| 69.3920 | −29.9882 | 19.9995 | 66.7233 | −32.2482 | 19.9995 |
| 69.7979 | −31.1237 | 19.9995 | 67.3624 | −32.8845 | 19.9995 |
| 69.8088 | −32.3058 | 19.9995 | 68.1715 | −33.2629 | 19.9995 |
| 69.0354 | −33.1916 | 19.9995 | 69.0354 | −33.1916 | 19.9995 |
| 3.1458 | 3.5408 | 29.9992 | 3.1458 | 3.5408 | 29.9992 |
| 2.6028 | 4.0893 | 29.9992 | 3.6203 | 3.2226 | 29.9992 |
| 2.2078 | 4.7530 | 29.9992 | 4.1359 | 2.9730 | 29.9992 |
| 2.0926 | 5.1205 | 29.9992 | 4.4088 | 2.8798 | 29.9992 |
| 1.9775 | 5.4881 | 29.9992 | 4.6817 | 2.7865 | 29.9992 |
| 1.9281 | 6.6811 | 29.9992 | 5.5566 | 2.6275 | 29.9992 |
| 2.0844 | 7.8659 | 29.9992 | 6.4370 | 2.6412 | 29.9992 |
| 2.3532 | 9.0288 | 29.9992 | 7.3010 | 2.8249 | 29.9992 |
| 2.7043 | 10.1753 | 29.9992 | 8.1375 | 3.1239 | 29.9992 |
| 3.1129 | 11.2943 | 29.9992 | 8.9520 | 3.4859 | 29.9992 |
| 3.5764 | 12.3831 | 29.9992 | 9.7501 | 3.8754 | 29.9992 |
| 4.0920 | 13.4445 | 29.9992 | 10.5345 | 4.2895 | 29.9992 |
| 4.6598 | 14.4785 | 29.9992 | 11.3135 | 4.7146 | 29.9992 |
| 5.2714 | 15.4850 | 29.9992 | 12.0896 | 5.1452 | 29.9992 |
| 5.9296 | 16.4669 | 29.9992 | 12.8685 | 5.5676 | 29.9992 |
| 6.6317 | 17.4268 | 29.9992 | 13.6584 | 5.9762 | 29.9992 |
| 7.3723 | 18.3593 | 29.9992 | 14.4565 | 6.3630 | 29.9992 |
| 8.1539 | 19.2534 | 29.9992 | 15.2656 | 6.7223 | 29.9992 |
| 8.9685 | 20.1119 | 29.9992 | 16.0884 | 7.0541 | 29.9992 |
| 9.8215 | 20.9320 | 29.9992 | 16.9249 | 7.3531 | 29.9992 |
| 10.7101 | 21.7136 | 29.9992 | 17.7724 | 7.6164 | 29.9992 |
| 11.6371 | 22.4541 | 29.9992 | 18.6281 | 7.8467 | 29.9992 |
| 12.6052 | 23.1508 | 29.9992 | 19.4948 | 8.0415 | 29.9992 |
| 13.6036 | 23.7980 | 29.9992 | 20.3670 | 8.2005 | 29.9992 |
| 14.6293 | 24.3932 | 29.9992 | 21.2446 | 8.3185 | 29.9992 |
| 15.6825 | 24.9307 | 29.9992 | 22.1278 | 8.4008 | 29.9992 |
| 16.7659 | 25.4135 | 29.9992 | 23.0136 | 8.4446 | 29.9992 |
| 17.8821 | 25.8386 | 29.9992 | 23.9023 | 8.4529 | 29.9992 |
| 19.0176 | 26.1951 | 29.9992 | 24.7881 | 8.4227 | 29.9992 |
| 20.1668 | 26.4831 | 29.9992 | 25.6740 | 8.3541 | 29.9992 |
| 21.3269 | 26.6970 | 29.9992 | 26.5544 | 8.2527 | 29.9992 |
| 22.4980 | 26.8369 | 29.9992 | 27.4321 | 8.1183 | 29.9992 |
| 23.6856 | 26.9027 | 29.9992 | 28.3015 | 7.9510 | 29.9992 |
| 24.8786 | 26.8945 | 29.9992 | 29.1682 | 7.7507 | 29.9992 |
| 26.0635 | 26.8095 | 29.9992 | 30.0239 | 7.5231 | 29.9992 |
| 27.2318 | 26.6477 | 29.9992 | 30.8741 | 7.2708 | 29.9992 |
| 28.3892 | 26.4145 | 29.9992 | 31.7161 | 6.9883 | 29.9992 |
| 29.5329 | 26.1073 | 29.9992 | 32.5498 | 6.6839 | 29.9992 |
| 30.6629 | 25.7343 | 29.9992 | 33.3726 | 6.3547 | 29.9992 |
| 31.7709 | 25.2983 | 29.9992 | 34.1900 | 6.0037 | 29.9992 |
| 32.8515 | 24.8073 | 29.9992 | 34.9936 | 5.6334 | 29.9992 |
| 33.8992 | 24.2643 | 29.9992 | 35.7889 | 5.2412 | 29.9992 |
| 34.9195 | 23.6746 | 29.9992 | 36.5761 | 4.8298 | 29.9992 |
| 35.9151 | 23.0356 | 29.9992 | 37.3522 | 4.4047 | 29.9992 |
| 36.8887 | 22.3581 | 29.9992 | 38.1229 | 3.9604 | 29.9992 |
| 37.8377 | 21.6423 | 29.9992 | 38.8799 | 3.4996 | 29.9992 |
| 38.7620 | 20.8963 | 29.9992 | 39.6314 | 3.0252 | 29.9992 |
| 39.6616 | 20.1256 | 29.9992 | 40.3692 | 2.5342 | 29.9992 |
| 40.5365 | 19.3275 | 29.9992 | 41.1015 | 2.0296 | 29.9992 |
| 41.3867 | 18.5102 | 29.9992 | 41.8200 | 1.5112 | 29.9992 |
| 42.2205 | 17.6737 | 29.9992 | 42.5304 | 0.9819 | 29.9992 |
| 43.0350 | 16.8180 | 29.9992 | 43.2325 | 0.4388 | 29.9992 |
| 43.8304 | 15.9431 | 29.9992 | 43.9236 | −0.1179 | 29.9992 |
| 44.6148 | 15.0544 | 29.9992 | 44.6066 | −0.6857 | 29.9992 |
| 45.3800 | 14.1521 | 29.9992 | 45.2785 | −1.2644 | 29.9992 |
| 46.1342 | 13.2333 | 29.9992 | 45.9422 | −1.8513 | 29.9992 |
| 46.8693 | 12.3063 | 29.9992 | 46.5977 | −2.4492 | 29.9992 |
| 47.5933 | 11.3683 | 29.9992 | 47.2450 | −3.0553 | 29.9992 |
| 48.3037 | 10.4221 | 29.9992 | 47.8840 | −3.6724 | 29.9992 |
| 49.0003 | 9.4649 | 29.9992 | 48.5121 | −4.2977 | 29.9992 |
| 49.6887 | 8.5022 | 29.9992 | 49.1347 | −4.9313 | 29.9992 |
| 50.3634 | 7.5341 | 29.9992 | 49.7490 | −5.5703 | 29.9992 |
| 51.0299 | 6.5577 | 29.9992 | 50.3524 | −6.2203 | 29.9992 |
| 51.6881 | 5.5758 | 29.9992 | 50.9476 | −6.8786 | 29.9992 |
| 52.3381 | 4.5885 | 29.9992 | 51.5345 | −7.5450 | 29.9992 |
| 52.9799 | 3.5956 | 29.9992 | 52.1105 | −8.2197 | 29.9992 |
| 53.6134 | 2.5973 | 29.9992 | 52.6782 | −8.8999 | 29.9992 |
| 54.2388 | 1.5962 | 29.9992 | 53.2377 | −9.5883 | 29.9992 |
| 54.8559 | 0.5842 | 29.9992 | 53.7862 | −10.2850 | 29.9992 |
| 55.4620 | −0.4306 | 29.9992 | 54.3293 | −10.9871 | 29.9992 |
| 56.0599 | −1.4509 | 29.9992 | 54.8641 | −11.6947 | 29.9992 |
| 56.6523 | −2.4794 | 29.9992 | 55.3907 | −12.4078 | 29.9992 |
| 57.2338 | −3.5106 | 29.9992 | 55.9118 | −13.1264 | 29.9992 |
| 57.8070 | −4.5473 | 29.9992 | 56.4247 | −13.8504 | 29.9992 |
| 58.3747 | −5.5868 | 29.9992 | 56.9348 | −14.5772 | 29.9992 |
| 58.9342 | −6.6290 | 29.9992 | 57.4340 | −15.3095 | 29.9992 |
| 59.4855 | −7.6767 | 29.9992 | 57.9304 | −16.0445 | 29.9992 |
| 60.0313 | −8.7271 | 29.9992 | 58.4186 | −16.7851 | 29.9992 |
| 60.5661 | −9.7831 | 29.9992 | 58.8985 | −17.5311 | 29.9992 |
| 61.0899 | −10.8417 | 29.9992 | 59.3730 | −18.2825 | 29.9992 |
| 61.6083 | −11.9059 | 29.9992 | 59.8365 | −19.0368 | 29.9992 |

TABLE I-continued

| SUCTION SIDE | | | PRESSURE SIDE | | | SUCTION SIDE | | | PRESSURE SIDE | | |
|---|---|---|---|---|---|---|---|---|---|---|---|
| X (%) | Y (%) | Z (%) | X (%) | Y (%) | Z (%) | X (%) | Y (%) | Z (%) | X (%) | Y (%) | Z (%) |
| 62.1129 | −12.9755 | 29.9992 | 60.2918 | −19.7992 | 29.9992 | 47.3053 | 11.1983 | 39.9989 | 47.0119 | −2.7564 | 39.9989 |
| 62.6121 | −14.0479 | 29.9992 | 60.7389 | −20.5644 | 29.9992 | 47.9965 | 10.2658 | 39.9989 | 47.6345 | −3.3707 | 39.9989 |
| 63.1003 | −15.1258 | 29.9992 | 61.1777 | −21.3379 | 29.9992 | 48.6767 | 9.3250 | 39.9989 | 48.2488 | −3.9961 | 39.9989 |
| 63.5830 | −16.2064 | 29.9992 | 61.6056 | −22.1168 | 29.9992 | 49.3486 | 8.3761 | 39.9989 | 48.8549 | −4.6269 | 39.9989 |
| 64.0575 | −17.2924 | 29.9992 | 62.0252 | −22.8984 | 29.9992 | 50.0096 | 7.4216 | 39.9989 | 49.4501 | −5.2659 | 39.9989 |
| 64.5237 | −18.3813 | 29.9992 | 62.4366 | −23.6828 | 29.9992 | 50.6624 | 6.4617 | 39.9989 | 50.0398 | −5.9132 | 39.9989 |
| 64.9818 | −19.4729 | 29.9992 | 62.8425 | −24.4727 | 29.9992 | 51.3041 | 5.4935 | 39.9989 | 50.6212 | −6.5659 | 39.9989 |
| 65.4343 | −20.5672 | 29.9992 | 63.2402 | −25.2654 | 29.9992 | 51.9404 | 4.5226 | 39.9989 | 51.1917 | −7.2296 | 39.9989 |
| 65.8786 | −21.6670 | 29.9992 | 63.6296 | −26.0580 | 29.9992 | 52.5658 | 3.5463 | 39.9989 | 51.7567 | −7.8961 | 39.9989 |
| 66.3174 | −22.7668 | 29.9992 | 64.0163 | −26.8561 | 29.9992 | 53.1856 | 2.5644 | 39.9989 | 52.3134 | −8.5735 | 39.9989 |
| 66.7508 | −23.8721 | 29.9992 | 64.3921 | −27.6569 | 29.9992 | 53.7972 | 1.5798 | 39.9989 | 52.8620 | −9.2537 | 39.9989 |
| 67.1841 | −24.9746 | 29.9992 | 64.7623 | −28.4633 | 29.9992 | 54.4006 | 0.5897 | 39.9989 | 53.4023 | −9.9394 | 39.9989 |
| 67.6229 | −26.0744 | 29.9992 | 65.1271 | −29.2779 | 29.9992 | 54.9957 | −0.4032 | 39.9989 | 53.9371 | −10.6333 | 39.9989 |
| 68.0672 | −27.1715 | 29.9992 | 65.4946 | −30.0897 | 29.9992 | 55.5854 | −1.4015 | 39.9989 | 54.4637 | −11.3299 | 39.9989 |
| 68.5170 | −28.2658 | 29.9992 | 65.8923 | −30.8851 | 29.9992 | 56.1641 | −2.4026 | 39.9989 | 54.9875 | −12.0320 | 39.9989 |
| 68.9614 | −29.3656 | 29.9992 | 66.3778 | −31.6256 | 29.9992 | 56.7373 | −3.4119 | 39.9989 | 55.5031 | −12.7396 | 39.9989 |
| 69.3645 | −30.4846 | 29.9992 | 67.0196 | −32.2427 | 29.9992 | 57.3023 | −4.4212 | 39.9989 | 56.0133 | −13.4500 | 39.9989 |
| 69.4358 | −31.6420 | 29.9992 | 67.8314 | −32.6074 | 29.9992 | 57.8591 | −5.4359 | 39.9989 | 56.5179 | −14.1658 | 39.9989 |
| 68.6843 | −32.5416 | 29.9992 | 68.6843 | −32.5416 | 29.9992 | 58.4076 | −6.4562 | 39.9989 | 57.0171 | −14.8844 | 39.9989 |
| 3.7876 | 5.0904 | 39.9989 | 3.7876 | 5.0904 | 39.9989 | 58.9507 | −7.4792 | 39.9989 | 57.5080 | −15.6085 | 39.9989 |
| 3.2638 | 5.6389 | 39.9989 | 4.2456 | 4.7613 | 39.9989 | 59.4882 | −8.5077 | 39.9989 | 57.9935 | −16.3380 | 39.9989 |
| 2.8743 | 6.2862 | 39.9989 | 4.7475 | 4.4980 | 39.9989 | 60.0203 | −9.5390 | 39.9989 | 58.4707 | −17.0703 | 39.9989 |
| 2.7605 | 6.6468 | 39.9989 | 5.0122 | 4.3965 | 39.9989 | 60.5469 | −10.5729 | 39.9989 | 58.9397 | −17.8081 | 39.9989 |
| 2.6467 | 7.0075 | 39.9989 | 5.2769 | 4.2950 | 39.9989 | 61.0625 | −11.6124 | 39.9989 | 59.4032 | −18.5513 | 39.9989 |
| 2.5808 | 8.1759 | 39.9989 | 6.1298 | 4.0975 | 39.9989 | 61.5726 | −12.6546 | 39.9989 | 59.8557 | −19.2973 | 39.9989 |
| 2.7262 | 9.3415 | 39.9989 | 6.9993 | 4.0701 | 39.9989 | 62.0691 | −13.7051 | 39.9989 | 60.3028 | −20.0488 | 39.9989 |
| 2.9840 | 10.4824 | 39.9989 | 7.8605 | 4.2100 | 39.9989 | 62.5573 | −14.7582 | 39.9989 | 60.7444 | −20.8058 | 39.9989 |
| 3.3241 | 11.6042 | 39.9989 | 8.6942 | 4.4788 | 39.9989 | 63.0345 | −15.8169 | 39.9989 | 61.1777 | −21.5655 | 39.9989 |
| 3.7273 | 12.7067 | 39.9989 | 9.5006 | 4.8216 | 39.9989 | 63.5053 | −16.8811 | 39.9989 | 61.6056 | −22.3280 | 39.9989 |
| 4.1853 | 13.7873 | 39.9989 | 10.2904 | 5.2001 | 39.9989 | 63.9642 | −17.9479 | 39.9989 | 62.0252 | −23.0959 | 39.9989 |
| 4.6954 | 14.8405 | 39.9989 | 11.0694 | 5.6005 | 39.9989 | 64.4223 | −19.0148 | 39.9989 | 62.4393 | −23.8666 | 39.9989 |
| 5.2577 | 15.8608 | 39.9989 | 11.8400 | 6.0119 | 39.9989 | 64.8775 | −20.0845 | 39.9989 | 62.8452 | −24.6400 | 39.9989 |
| 5.8665 | 16.8481 | 39.9989 | 12.6107 | 6.4260 | 39.9989 | 65.3301 | −21.1569 | 39.9989 | 63.2402 | −25.4217 | 39.9989 |
| 6.5166 | 17.8081 | 39.9989 | 13.3842 | 6.8347 | 39.9989 | 65.7799 | −22.2265 | 39.9989 | 63.6214 | −26.2088 | 39.9989 |
| 7.2104 | 18.7378 | 39.9989 | 14.1658 | 7.2269 | 39.9989 | 66.2269 | −23.2989 | 39.9989 | 63.9889 | −27.0042 | 39.9989 |
| 7.9482 | 19.6402 | 39.9989 | 14.9612 | 7.5944 | 39.9989 | 66.6630 | −24.3767 | 39.9989 | 64.3427 | −27.8051 | 39.9989 |
| 8.7326 | 20.5096 | 39.9989 | 15.7648 | 7.9372 | 39.9989 | 67.0936 | −25.4546 | 39.9989 | 64.6938 | −28.6059 | 39.9989 |
| 9.5554 | 21.3379 | 39.9989 | 16.5848 | 8.2444 | 39.9989 | 67.5269 | −26.5297 | 39.9989 | 65.0586 | −29.4040 | 39.9989 |
| 10.4139 | 22.1250 | 39.9989 | 17.4159 | 8.5214 | 39.9989 | 67.9795 | −27.6021 | 39.9989 | 65.4645 | −30.1829 | 39.9989 |
| 11.3052 | 22.8683 | 39.9989 | 18.2551 | 8.7628 | 39.9989 | 68.4485 | −28.6690 | 39.9989 | 65.9554 | −30.9152 | 39.9989 |
| 12.2377 | 23.5649 | 39.9989 | 19.1053 | 8.9657 | 39.9989 | 68.8626 | −29.7523 | 39.9989 | 66.5835 | −31.5296 | 39.9989 |
| 13.2086 | 24.2149 | 39.9989 | 19.9665 | 9.1303 | 39.9989 | 68.9284 | −30.8878 | 39.9989 | 67.3761 | −31.8697 | 39.9989 |
| 14.2124 | 24.8156 | 39.9989 | 20.8305 | 9.2565 | 39.9989 | 68.2126 | −31.7682 | 39.9989 | 68.2126 | −31.7682 | 39.9989 |
| 15.2464 | 25.3559 | 39.9989 | 21.7026 | 9.3415 | 39.9989 | 4.2785 | 6.8786 | 49.9986 | 4.2785 | 6.8786 | 49.9986 |
| 16.3051 | 25.8358 | 39.9989 | 22.5775 | 9.3854 | 39.9989 | 3.7712 | 7.4216 | 49.9986 | 4.7311 | 6.5440 | 49.9986 |
| 17.3912 | 26.2555 | 39.9989 | 23.4525 | 9.3909 | 39.9989 | 3.3927 | 8.0634 | 49.9986 | 5.2275 | 6.2725 | 49.9986 |
| 18.5020 | 26.6093 | 39.9989 | 24.3246 | 9.3607 | 39.9989 | 3.2816 | 8.4186 | 49.9986 | 5.4881 | 6.1682 | 49.9986 |
| 19.6374 | 26.8945 | 39.9989 | 25.1968 | 9.2894 | 39.9989 | 3.1705 | 8.7738 | 49.9986 | 5.7486 | 6.0640 | 49.9986 |
| 20.7839 | 27.1057 | 39.9989 | 26.0662 | 9.1852 | 39.9989 | 3.1157 | 9.9174 | 49.9986 | 6.5906 | 5.8473 | 49.9986 |
| 21.9358 | 27.2401 | 39.9989 | 26.9301 | 9.0453 | 39.9989 | 3.2555 | 11.0556 | 49.9986 | 7.4518 | 5.7925 | 49.9986 |
| 23.0849 | 27.2977 | 39.9989 | 27.7886 | 8.8752 | 39.9989 | 3.5106 | 12.1774 | 49.9986 | 8.3102 | 5.9159 | 49.9986 |
| 24.2423 | 27.2812 | 39.9989 | 28.6388 | 8.6695 | 39.9989 | 3.8479 | 13.2717 | 49.9986 | 9.1385 | 6.1600 | 49.9986 |
| 25.4025 | 27.1907 | 39.9989 | 29.4808 | 8.4364 | 39.9989 | 4.2511 | 14.3414 | 49.9986 | 9.9421 | 6.4699 | 49.9986 |
| 26.5599 | 27.0289 | 39.9989 | 30.3173 | 8.1759 | 39.9989 | 4.7119 | 15.3863 | 49.9986 | 10.7293 | 6.8210 | 49.9986 |
| 27.7036 | 26.7930 | 39.9989 | 31.1429 | 7.8879 | 39.9989 | 5.2248 | 16.4093 | 49.9986 | 11.5082 | 7.1885 | 49.9986 |
| 28.8253 | 26.4941 | 39.9989 | 31.9602 | 7.5752 | 39.9989 | 5.7925 | 17.4049 | 49.9986 | 12.2816 | 7.5697 | 49.9986 |
| 29.9224 | 26.1293 | 39.9989 | 32.7693 | 7.2406 | 39.9989 | 6.4041 | 18.3676 | 49.9986 | 13.0550 | 7.9482 | 49.9986 |
| 31.0002 | 25.7042 | 39.9989 | 33.5674 | 6.8841 | 39.9989 | 7.0623 | 19.2946 | 49.9986 | 13.8285 | 8.3212 | 49.9986 |
| 32.0617 | 25.2242 | 39.9989 | 34.3573 | 6.5083 | 39.9989 | 7.7645 | 20.1860 | 49.9986 | 14.6129 | 8.6723 | 49.9986 |
| 33.1011 | 24.6894 | 39.9989 | 35.1362 | 6.1134 | 39.9989 | 8.5105 | 21.0444 | 49.9986 | 15.4028 | 8.9932 | 49.9986 |
| 34.1132 | 24.1080 | 39.9989 | 35.9069 | 5.6992 | 39.9989 | 9.3031 | 21.8672 | 49.9986 | 16.2036 | 9.2839 | 49.9986 |
| 35.0950 | 23.4854 | 39.9989 | 36.6693 | 5.2714 | 39.9989 | 10.1369 | 22.6516 | 49.9986 | 17.0100 | 9.5444 | 49.9986 |
| 36.0467 | 22.8271 | 39.9989 | 37.4235 | 4.8243 | 39.9989 | 11.0118 | 23.3894 | 49.9986 | 17.8273 | 9.7693 | 49.9986 |
| 36.9765 | 22.1332 | 39.9989 | 38.1668 | 4.3636 | 39.9989 | 11.9196 | 24.0778 | 49.9986 | 18.6555 | 9.9641 | 49.9986 |
| 37.8843 | 21.4092 | 39.9989 | 38.9018 | 3.8891 | 39.9989 | 12.8603 | 24.7168 | 49.9986 | 19.4948 | 10.1177 | 49.9986 |
| 38.7729 | 20.6549 | 39.9989 | 39.6286 | 3.3982 | 39.9989 | 13.8394 | 25.3037 | 49.9986 | 20.3478 | 10.2356 | 49.9986 |
| 39.6396 | 19.8760 | 39.9989 | 40.3445 | 2.8935 | 39.9989 | 14.8515 | 25.8358 | 49.9986 | 21.2090 | 10.3151 | 49.9986 |
| 40.4871 | 19.0752 | 39.9989 | 41.0493 | 2.3779 | 39.9989 | 15.8964 | 26.3076 | 49.9986 | 22.0729 | 10.3508 | 49.9986 |
| 41.3126 | 18.2579 | 39.9989 | 41.7460 | 1.8486 | 39.9989 | 16.9606 | 26.7162 | 49.9986 | 22.9368 | 10.3480 | 49.9986 |
| 42.1162 | 17.4214 | 39.9989 | 42.4344 | 1.3082 | 39.9989 | 18.0439 | 27.0536 | 49.9986 | 23.7953 | 10.3069 | 49.9986 |
| 42.9034 | 16.5711 | 39.9989 | 43.1118 | 0.7570 | 39.9989 | 19.1492 | 27.3251 | 49.9986 | 24.6455 | 10.2301 | 49.9986 |
| 43.6741 | 15.7045 | 39.9989 | 43.7838 | 0.1947 | 39.9989 | 20.2765 | 27.5280 | 49.9986 | 25.4930 | 10.1177 | 49.9986 |
| 44.4283 | 14.8268 | 39.9989 | 44.4447 | −0.3757 | 39.9989 | 21.4147 | 27.6542 | 49.9986 | 26.3350 | 9.9723 | 49.9986 |
| 45.1661 | 13.9354 | 39.9989 | 45.0975 | −0.9572 | 39.9989 | 22.5529 | 27.7008 | 49.9986 | 27.1742 | 9.7940 | 49.9986 |
| 45.8901 | 13.0331 | 39.9989 | 45.7448 | −1.5496 | 39.9989 | 23.6883 | 27.6734 | 49.9986 | 28.0108 | 9.5828 | 49.9986 |
| 46.6032 | 12.1198 | 39.9989 | 46.3811 | −2.1475 | 39.9989 | 24.8210 | 27.5719 | 49.9986 | 28.8418 | 9.3415 | 49.9986 |

TABLE I-continued

| SUCTION SIDE | | | PRESSURE SIDE | | |
|---|---|---|---|---|---|
| X (%) | Y (%) | Z (%) | X(%) | Y (%) | Z (%) |
| 25.9483 | 27.3991 | 49.9986 | 29.6618 | 9.0727 | 49.9986 |
| 27.0700 | 27.1578 | 49.9986 | 30.4737 | 8.7792 | 49.9986 |
| 28.1671 | 26.8534 | 49.9986 | 31.2718 | 8.4638 | 49.9986 |
| 29.2367 | 26.4886 | 49.9986 | 32.0589 | 8.1237 | 49.9986 |
| 30.2817 | 26.0690 | 49.9986 | 32.8351 | 7.7672 | 49.9986 |
| 31.3074 | 25.5972 | 49.9986 | 33.6030 | 7.3915 | 49.9986 |
| 32.3140 | 25.0761 | 49.9986 | 34.3627 | 6.9965 | 49.9986 |
| 33.2986 | 24.5084 | 49.9986 | 35.1115 | 6.5851 | 49.9986 |
| 34.2613 | 23.8995 | 49.9986 | 35.8547 | 6.1545 | 49.9986 |
| 35.2020 | 23.2522 | 49.9986 | 36.5870 | 5.7102 | 49.9986 |
| 36.1180 | 22.5721 | 49.9986 | 37.3138 | 5.2494 | 49.9986 |
| 37.0067 | 21.8672 | 49.9986 | 38.0324 | 4.7750 | 49.9986 |
| 37.8761 | 21.1349 | 49.9986 | 38.7428 | 4.2868 | 49.9986 |
| 38.7263 | 20.3779 | 49.9986 | 39.4449 | 3.7876 | 49.9986 |
| 39.5573 | 19.5990 | 49.9986 | 40.1360 | 3.2747 | 49.9986 |
| 40.3692 | 18.7982 | 49.9986 | 40.8190 | 2.7509 | 49.9986 |
| 41.1645 | 17.9809 | 49.9986 | 41.4937 | 2.2188 | 49.9986 |
| 41.9407 | 17.1498 | 49.9986 | 42.1601 | 1.6730 | 49.9986 |
| 42.6977 | 16.3051 | 49.9986 | 42.8184 | 1.1190 | 49.9986 |
| 43.4382 | 15.4466 | 49.9986 | 43.4656 | 0.5540 | 49.9986 |
| 44.1623 | 14.5772 | 49.9986 | 44.1074 | -0.0192 | 49.9986 |
| 44.8753 | 13.6996 | 49.9986 | 44.7410 | -0.6006 | 49.9986 |
| 45.5747 | 12.8109 | 49.9986 | 45.3663 | -1.1931 | 49.9986 |
| 46.2631 | 11.9141 | 49.9986 | 45.9861 | -1.7910 | 49.9986 |
| 46.9406 | 11.0090 | 49.9986 | 46.5977 | -2.3998 | 49.9986 |
| 47.6098 | 10.0985 | 49.9986 | 47.2011 | -3.0142 | 49.9986 |
| 48.2708 | 9.1797 | 49.9986 | 47.7990 | -3.6368 | 49.9986 |
| 48.9208 | 8.2554 | 49.9986 | 48.3887 | -4.2648 | 49.9986 |
| 49.5598 | 7.3229 | 49.9986 | 48.9701 | -4.9011 | 49.9986 |
| 50.1906 | 6.3822 | 49.9986 | 49.5461 | -5.5457 | 49.9986 |
| 50.8159 | 5.4387 | 49.9986 | 50.1138 | -6.1929 | 49.9986 |
| 51.4303 | 4.4870 | 49.9986 | 50.6733 | -6.8484 | 49.9986 |
| 52.0419 | 3.5298 | 49.9986 | 51.2273 | -7.5067 | 49.9986 |
| 52.6453 | 2.5699 | 49.9986 | 51.7759 | -8.1731 | 49.9986 |
| 53.2404 | 1.6045 | 49.9986 | 52.3162 | -8.8451 | 49.9986 |
| 53.8329 | 0.6363 | 49.9986 | 52.8510 | -9.5225 | 49.9986 |
| 54.4143 | -0.3373 | 49.9986 | 53.3776 | -10.2027 | 49.9986 |
| 54.9903 | -1.3165 | 49.9986 | 53.8987 | -10.8911 | 49.9986 |
| 55.5580 | -2.2983 | 49.9986 | 54.4143 | -11.5822 | 49.9986 |
| 56.1202 | -3.2830 | 49.9986 | 54.9217 | -12.2816 | 49.9986 |
| 56.6770 | -4.2731 | 49.9986 | 55.4236 | -12.9810 | 49.9986 |
| 57.2255 | -5.2659 | 49.9986 | 55.9173 | -13.6859 | 49.9986 |
| 57.7686 | -6.2615 | 49.9986 | 56.4082 | -14.3962 | 49.9986 |
| 58.3089 | -7.2598 | 49.9986 | 56.8937 | -15.1066 | 49.9986 |
| 58.8437 | -8.2609 | 49.9986 | 57.3736 | -15.8224 | 49.9986 |
| 59.3703 | -9.2647 | 49.9986 | 57.8509 | -16.5410 | 49.9986 |
| 59.8886 | -10.2740 | 49.9986 | 58.3226 | -17.2623 | 49.9986 |
| 60.4015 | -11.2888 | 49.9986 | 58.7888 | -17.9863 | 49.9986 |
| 60.9007 | -12.3063 | 49.9986 | 59.2496 | -18.7159 | 49.9986 |
| 61.3916 | -13.3293 | 49.9986 | 59.7049 | -19.4454 | 49.9986 |
| 61.8743 | -14.3578 | 49.9986 | 60.1547 | -20.1805 | 49.9986 |
| 62.3488 | -15.3863 | 49.9986 | 60.5963 | -20.9210 | 49.9986 |
| 62.8178 | -16.4203 | 49.9986 | 61.0296 | -21.6670 | 49.9986 |
| 63.2813 | -17.4570 | 49.9986 | 61.4547 | -22.4171 | 49.9986 |
| 63.7421 | -18.4937 | 49.9986 | 61.8716 | -23.1727 | 49.9986 |
| 64.1974 | -19.5332 | 49.9986 | 62.2720 | -23.9352 | 49.9986 |
| 64.6499 | -20.5727 | 49.9986 | 62.6615 | -24.7031 | 49.9986 |
| 65.0942 | -21.6176 | 49.9986 | 63.0372 | -25.4820 | 49.9986 |
| 65.5330 | -22.6626 | 49.9986 | 63.3992 | -26.2664 | 49.9986 |
| 65.9691 | -23.7103 | 49.9986 | 63.7476 | -27.0563 | 49.9986 |
| 66.4079 | -24.7552 | 49.9986 | 64.0877 | -27.8462 | 49.9986 |
| 66.8577 | -25.7974 | 49.9986 | 64.4387 | -28.6306 | 49.9986 |
| 67.3212 | -26.8342 | 49.9986 | 64.8474 | -29.3821 | 49.9986 |
| 67.7820 | -27.8736 | 49.9986 | 65.3548 | -30.0732 | 49.9986 |
| 68.1797 | -28.9323 | 49.9986 | 65.9554 | -30.6958 | 49.9986 |
| 68.2675 | -30.0376 | 49.9986 | 66.7343 | -31.0743 | 49.9986 |
| 67.5763 | -30.9097 | 49.9986 | 67.5763 | -30.9097 | 49.9986 |
| 4.6790 | 9.0069 | 59.9984 | 4.6790 | 9.0069 | 59.9984 |
| 3.9659 | 9.8626 | 59.9984 | 5.1178 | 8.6833 | 59.9984 |
| 3.5847 | 10.9103 | 59.9984 | 5.5950 | 8.4172 | 59.9984 |
| 3.5463 | 12.0265 | 59.9984 | 5.8487 | 8.3144 | 59.9984 |
| 3.6971 | 13.1346 | 59.9984 | 6.1024 | 8.2115 | 59.9984 |
| 3.9577 | 14.2207 | 59.9984 | 6.9225 | 8.0113 | 59.9984 |
| 4.3005 | 15.2821 | 59.9984 | 7.7617 | 7.9592 | 59.9984 |
| 4.7174 | 16.3215 | 59.9984 | 8.5955 | 8.0552 | 59.9984 |
| 5.1918 | 17.3336 | 59.9984 | 9.4128 | 8.2691 | 59.9984 |
| 5.7239 | 18.3155 | 59.9984 | 10.2137 | 8.5461 | 59.9984 |
| 6.3081 | 19.2589 | 59.9984 | 11.0008 | 8.8560 | 59.9984 |
| 6.9417 | 20.1668 | 59.9984 | 11.7825 | 9.1769 | 59.9984 |
| 7.6218 | 21.0389 | 59.9984 | 12.5614 | 9.5006 | 59.9984 |
| 8.3459 | 21.8782 | 59.9984 | 13.3403 | 9.8187 | 59.9984 |
| 9.1193 | 22.6818 | 59.9984 | 14.1274 | 10.1259 | 59.9984 |
| 9.9366 | 23.4442 | 59.9984 | 14.9228 | 10.4111 | 59.9984 |
| 10.7924 | 24.1546 | 59.9984 | 15.7264 | 10.6689 | 59.9984 |
| 11.6782 | 24.8183 | 59.9984 | 16.5382 | 10.8938 | 59.9984 |
| 12.6025 | 25.4299 | 59.9984 | 17.3610 | 11.0831 | 59.9984 |
| 13.5679 | 25.9894 | 59.9984 | 18.1920 | 11.2339 | 59.9984 |
| 14.5662 | 26.4941 | 59.9984 | 19.0286 | 11.3464 | 59.9984 |
| 15.5865 | 26.9329 | 59.9984 | 19.8678 | 11.4232 | 59.9984 |
| 16.6260 | 27.3059 | 59.9984 | 20.7125 | 11.4643 | 59.9984 |
| 17.6901 | 27.6158 | 59.9984 | 21.5545 | 11.4670 | 59.9984 |
| 18.7762 | 27.8544 | 59.9984 | 22.3993 | 11.4341 | 59.9984 |
| 19.8788 | 28.0245 | 59.9984 | 23.2385 | 11.3656 | 59.9984 |
| 20.9896 | 28.1232 | 59.9984 | 24.0778 | 11.2641 | 59.9984 |
| 22.0976 | 28.1506 | 59.9984 | 24.9088 | 11.1270 | 59.9984 |
| 23.2029 | 28.1040 | 59.9984 | 25.7371 | 10.9569 | 59.9984 |
| 24.3054 | 27.9861 | 59.9984 | 26.5571 | 10.7567 | 59.9984 |
| 25.4052 | 27.7968 | 59.9984 | 27.3690 | 10.5263 | 59.9984 |
| 26.4913 | 27.5445 | 59.9984 | 28.1726 | 10.2685 | 59.9984 |
| 27.5500 | 27.2318 | 59.9984 | 28.9679 | 9.9860 | 59.9984 |
| 28.5867 | 26.8616 | 59.9984 | 29.7551 | 9.6788 | 59.9984 |
| 29.5987 | 26.4392 | 59.9984 | 30.5313 | 9.3497 | 59.9984 |
| 30.5943 | 25.9675 | 59.9984 | 31.2992 | 9.0014 | 59.9984 |
| 31.5680 | 25.4464 | 59.9984 | 32.0562 | 8.6311 | 59.9984 |
| 32.5252 | 24.8814 | 59.9984 | 32.8077 | 8.2444 | 59.9984 |
| 33.4577 | 24.2807 | 59.9984 | 33.5482 | 7.8385 | 59.9984 |
| 34.3710 | 23.6444 | 59.9984 | 34.2805 | 7.4189 | 59.9984 |
| 35.2568 | 22.9780 | 59.9984 | 35.0018 | 6.9855 | 59.9984 |
| 36.1208 | 22.2868 | 59.9984 | 35.7176 | 6.5358 | 59.9984 |
| 36.9655 | 21.5683 | 59.9984 | 36.4225 | 6.0722 | 59.9984 |
| 37.7883 | 20.8250 | 59.9984 | 37.1219 | 5.5978 | 59.9984 |
| 38.5947 | 20.0625 | 59.9984 | 37.8103 | 5.1096 | 59.9984 |
| 39.3818 | 19.2781 | 59.9984 | 38.4904 | 4.6104 | 59.9984 |
| 40.1525 | 18.4773 | 59.9984 | 39.1624 | 4.1003 | 59.9984 |
| 40.9040 | 17.6627 | 59.9984 | 39.8261 | 3.5792 | 59.9984 |
| 41.6418 | 16.8344 | 59.9984 | 40.4844 | 3.0498 | 59.9984 |
| 42.3631 | 15.9979 | 59.9984 | 41.1316 | 2.5095 | 59.9984 |
| 43.0707 | 15.1532 | 59.9984 | 41.7734 | 1.9583 | 59.9984 |
| 43.7673 | 14.2975 | 59.9984 | 42.4042 | 1.4015 | 59.9984 |
| 44.4502 | 13.4308 | 59.9984 | 43.0295 | 0.8338 | 59.9984 |
| 45.1249 | 12.5586 | 59.9984 | 43.6494 | 0.2606 | 59.9984 |
| 45.7914 | 11.6782 | 59.9984 | 44.2610 | -0.3209 | 59.9984 |
| 46.4441 | 10.7896 | 59.9984 | 44.8644 | -0.9106 | 59.9984 |
| 47.0887 | 9.8928 | 59.9984 | 45.4623 | -1.5057 | 59.9984 |
| 47.7250 | 8.9932 | 59.9984 | 46.0547 | -2.1064 | 59.9984 |
| 48.3530 | 8.0854 | 59.9984 | 46.6389 | -2.7152 | 59.9984 |
| 48.9756 | 7.1693 | 59.9984 | 47.2148 | -3.3323 | 59.9984 |
| 49.5900 | 6.2505 | 59.9984 | 47.7880 | -3.9522 | 59.9984 |
| 50.1961 | 5.3262 | 59.9984 | 48.3530 | -4.5802 | 59.9984 |
| 50.7967 | 4.3965 | 59.9984 | 48.9098 | -5.2138 | 59.9984 |
| 51.3919 | 3.4640 | 59.9984 | 49.4611 | -5.8528 | 59.9984 |
| 51.9788 | 2.5260 | 59.9984 | 50.0069 | -6.4946 | 59.9984 |
| 52.5575 | 1.5825 | 59.9984 | 50.5444 | -7.1446 | 59.9984 |
| 53.1335 | 0.6363 | 59.9984 | 51.0765 | -7.8001 | 59.9984 |
| 53.7012 | -0.3127 | 59.9984 | 51.6031 | -8.4611 | 59.9984 |
| 54.2635 | -1.2644 | 59.9984 | 52.1242 | -9.1248 | 59.9984 |
| 54.8230 | -2.2188 | 59.9984 | 52.6398 | -9.7940 | 59.9984 |
| 55.3742 | -3.1787 | 59.9984 | 53.1472 | -10.4687 | 59.9984 |
| 55.9200 | -4.1387 | 59.9984 | 53.6491 | -11.1462 | 59.9984 |
| 56.4603 | -5.1041 | 59.9984 | 54.1483 | -11.8263 | 59.9984 |
| 56.9951 | -6.0722 | 59.9984 | 54.6392 | -12.5120 | 59.9984 |
| 57.5245 | -7.0431 | 59.9984 | 55.1274 | -13.2004 | 59.9984 |
| 58.0456 | -8.0168 | 59.9984 | 55.6101 | -13.8916 | 59.9984 |
| 58.5612 | -8.9932 | 59.9984 | 56.0873 | -14.5882 | 59.9984 |
| 59.0713 | -9.9750 | 59.9984 | 56.5591 | -15.2876 | 59.9984 |
| 59.5705 | -10.9624 | 59.9984 | 57.0281 | -15.9897 | 59.9984 |
| 60.0669 | -11.9498 | 59.9984 | 57.4916 | -16.6946 | 59.9984 |
| 60.5551 | -12.9453 | 59.9984 | 57.9523 | -17.4022 | 59.9984 |
| 61.0378 | -13.9409 | 59.9984 | 58.4049 | -18.1125 | 59.9984 |
| 61.5123 | -14.9393 | 59.9984 | 58.8547 | -18.8283 | 59.9984 |
| 61.9813 | -15.9431 | 59.9984 | 59.2990 | -19.5469 | 59.9984 |
| 62.4448 | -16.9496 | 59.9984 | 59.7351 | -20.2682 | 59.9984 |

TABLE I-continued

| SUCTION SIDE | | | PRESSURE SIDE | | |
|---|---|---|---|---|---|
| X (%) | Y (%) | Z (%) | X (%) | Y (%) | Z (%) |
| 62.9001 | −17.9589 | 59.9984 | 60.1657 | −20.9950 | 59.9984 |
| 63.3526 | −18.9710 | 59.9984 | 60.5853 | −21.7273 | 59.9984 |
| 63.7969 | −19.9857 | 59.9984 | 60.9939 | −22.4651 | 59.9984 |
| 64.2385 | −21.0033 | 59.9984 | 61.3944 | −23.2084 | 59.9984 |
| 64.6801 | −22.0208 | 59.9984 | 61.7811 | −23.9571 | 59.9984 |
| 65.1216 | −23.0356 | 59.9984 | 62.1596 | −24.7113 | 59.9984 |
| 65.5687 | −24.0476 | 59.9984 | 62.5271 | −25.4711 | 59.9984 |
| 66.0240 | −25.0597 | 59.9984 | 62.8919 | −26.2308 | 59.9984 |
| 66.4820 | −26.0662 | 59.9984 | 63.2566 | −26.9932 | 59.9984 |
| 66.9290 | −27.0810 | 59.9984 | 63.6351 | −27.7502 | 59.9984 |
| 67.1279 | −27.5994 | 59.9984 | 64.0410 | −28.4935 | 59.9984 |
| 67.3267 | −28.1177 | 59.9984 | 64.5183 | −29.1956 | 59.9984 |
| 67.4502 | −28.8116 | 59.9984 | 65.1381 | −29.7715 | 59.9984 |
| 67.2198 | −29.5000 | 59.9984 | 65.9170 | −30.0924 | 59.9984 |
| 66.7233 | −29.9909 | 59.9984 | 66.7233 | −29.9909 | 59.9984 |
| 4.9478 | 11.4286 | 70.0008 | 4.9478 | 11.4286 | 70.0008 |
| 4.2511 | 12.2652 | 70.0008 | 5.3838 | 11.1078 | 70.0008 |
| 3.8781 | 13.2882 | 70.0008 | 5.8611 | 10.8527 | 70.0008 |
| 3.8397 | 14.3660 | 70.0008 | 6.1134 | 10.7567 | 70.0008 |
| 4.0015 | 15.4412 | 70.0008 | 6.3657 | 10.6607 | 70.0008 |
| 4.2923 | 16.4889 | 70.0008 | 7.1803 | 10.4715 | 70.0008 |
| 4.6707 | 17.5064 | 70.0008 | 8.0113 | 10.4331 | 70.0008 |
| 5.1096 | 18.4937 | 70.0008 | 8.8368 | 10.5483 | 70.0008 |
| 5.6060 | 19.4591 | 70.0008 | 9.6514 | 10.7457 | 70.0008 |
| 6.1655 | 20.3862 | 70.0008 | 10.4550 | 10.9789 | 70.0008 |
| 6.7881 | 21.2720 | 70.0008 | 11.2504 | 11.2230 | 70.0008 |
| 7.4573 | 22.1140 | 70.0008 | 12.0457 | 11.4780 | 70.0008 |
| 8.1704 | 22.9176 | 70.0008 | 12.8411 | 11.7331 | 70.0008 |
| 8.9301 | 23.6801 | 70.0008 | 13.6420 | 11.9744 | 70.0008 |
| 9.7337 | 24.4042 | 70.0008 | 14.4456 | 12.1939 | 70.0008 |
| 10.5784 | 25.0843 | 70.0008 | 15.2547 | 12.3776 | 70.0008 |
| 11.4588 | 25.7069 | 70.0008 | 16.0692 | 12.5285 | 70.0008 |
| 12.3694 | 26.2774 | 70.0008 | 16.8865 | 12.6436 | 70.0008 |
| 13.3156 | 26.7930 | 70.0008 | 17.7093 | 12.7232 | 70.0008 |
| 14.2920 | 27.2510 | 70.0008 | 18.5349 | 12.7671 | 70.0008 |
| 15.3013 | 27.6487 | 70.0008 | 19.3632 | 12.7808 | 70.0008 |
| 16.3298 | 27.9833 | 70.0008 | 20.1969 | 12.7588 | 70.0008 |
| 17.3692 | 28.2466 | 70.0008 | 21.0252 | 12.7040 | 70.0008 |
| 18.4252 | 28.4441 | 70.0008 | 21.8507 | 12.6190 | 70.0008 |
| 19.4948 | 28.5730 | 70.0008 | 22.6681 | 12.5010 | 70.0008 |
| 20.5782 | 28.6333 | 70.0008 | 23.4771 | 12.3557 | 70.0008 |
| 21.6642 | 28.6278 | 70.0008 | 24.2835 | 12.1801 | 70.0008 |
| 22.7476 | 28.5511 | 70.0008 | 25.0843 | 11.9744 | 70.0008 |
| 23.8227 | 28.4030 | 70.0008 | 25.8824 | 11.7441 | 70.0008 |
| 24.8841 | 28.1945 | 70.0008 | 26.6723 | 11.4862 | 70.0008 |
| 25.9236 | 27.9230 | 70.0008 | 27.4512 | 11.2038 | 70.0008 |
| 26.9439 | 27.5966 | 70.0008 | 28.2219 | 10.8966 | 70.0008 |
| 27.9477 | 27.2154 | 70.0008 | 28.9789 | 10.5702 | 70.0008 |
| 28.9378 | 26.7793 | 70.0008 | 29.7249 | 10.2246 | 70.0008 |
| 29.9059 | 26.2966 | 70.0008 | 30.4627 | 9.8599 | 70.0008 |
| 30.8494 | 25.7727 | 70.0008 | 31.1895 | 9.4814 | 70.0008 |
| 31.7682 | 25.2078 | 70.0008 | 31.9081 | 9.0837 | 70.0008 |
| 32.6623 | 24.6126 | 70.0008 | 32.6184 | 8.6723 | 70.0008 |
| 33.5372 | 23.9845 | 70.0008 | 33.3205 | 8.2472 | 70.0008 |
| 34.3874 | 23.3290 | 70.0008 | 34.0172 | 7.8083 | 70.0008 |
| 35.2212 | 22.6461 | 70.0008 | 34.7056 | 7.3558 | 70.0008 |
| 36.0385 | 21.9385 | 70.0008 | 35.3885 | 6.8896 | 70.0008 |
| 36.8339 | 21.2090 | 70.0008 | 36.0632 | 6.4123 | 70.0008 |
| 37.6128 | 20.4602 | 70.0008 | 36.7297 | 5.9241 | 70.0008 |
| 38.3698 | 19.6950 | 70.0008 | 37.3906 | 5.4250 | 70.0008 |
| 39.1103 | 18.9161 | 70.0008 | 38.0434 | 4.9176 | 70.0008 |
| 39.8371 | 18.1235 | 70.0008 | 38.6879 | 4.3992 | 70.0008 |
| 40.5447 | 17.3199 | 70.0008 | 39.3270 | 3.8726 | 70.0008 |
| 41.2413 | 16.5026 | 70.0008 | 39.9578 | 3.3378 | 70.0008 |
| 41.9270 | 15.6770 | 70.0008 | 40.5831 | 2.7948 | 70.0008 |
| 42.6044 | 14.8405 | 70.0008 | 41.1974 | 2.2408 | 70.0008 |
| 43.2681 | 13.9985 | 70.0008 | 41.8091 | 1.6840 | 70.0008 |
| 43.9236 | 13.1456 | 70.0008 | 42.4124 | 1.1163 | 70.0008 |
| 44.5709 | 12.2871 | 70.0008 | 43.0076 | 0.5430 | 70.0008 |
| 45.2100 | 11.4204 | 70.0008 | 43.5973 | −0.0384 | 70.0008 |
| 45.8408 | 10.5483 | 70.0008 | 44.1815 | −0.6226 | 70.0008 |
| 46.4606 | 9.6679 | 70.0008 | 44.7602 | −1.2150 | 70.0008 |
| 47.0750 | 8.7847 | 70.0008 | 45.3334 | −1.8129 | 70.0008 |
| 47.6838 | 7.8934 | 70.0008 | 45.8984 | −2.4190 | 70.0008 |
| 48.2845 | 7.0020 | 70.0008 | 46.4606 | −3.0279 | 70.0008 |
| 48.8796 | 6.1024 | 70.0008 | 47.0146 | −3.6422 | 70.0008 |
| 49.4666 | 5.2028 | 70.0008 | 47.5631 | −4.2621 | 70.0008 |
| 50.0507 | 4.2950 | 70.0008 | 48.1035 | −4.8874 | 70.0008 |
| 50.6267 | 3.3872 | 70.0008 | 48.6410 | −5.5155 | 70.0008 |
| 51.1972 | 2.4739 | 70.0008 | 49.1731 | −6.1518 | 70.0008 |
| 51.7622 | 1.5578 | 70.0008 | 49.6997 | −6.7881 | 70.0008 |
| 52.3189 | 0.6363 | 70.0008 | 50.2208 | −7.4326 | 70.0008 |
| 52.8729 | −0.2852 | 70.0008 | 50.7391 | −8.0799 | 70.0008 |
| 53.4215 | −1.2123 | 70.0008 | 51.2493 | −8.7299 | 70.0008 |
| 53.9645 | −2.1420 | 70.0008 | 51.7539 | −9.3881 | 70.0008 |
| 54.5021 | −3.0745 | 70.0008 | 52.2503 | −10.0491 | 70.0008 |
| 55.0369 | −4.0098 | 70.0008 | 52.7440 | −10.7128 | 70.0008 |
| 55.5690 | −4.9478 | 70.0008 | 53.2322 | −11.3820 | 70.0008 |
| 56.0928 | −5.8885 | 70.0008 | 53.7149 | −12.0540 | 70.0008 |
| 56.6139 | −6.8320 | 70.0008 | 54.1922 | −12.7287 | 70.0008 |
| 57.1268 | −7.7782 | 70.0008 | 54.6694 | −13.4061 | 70.0008 |
| 57.6342 | −8.7271 | 70.0008 | 55.1411 | −14.0863 | 70.0008 |
| 58.1361 | −9.6788 | 70.0008 | 55.6074 | −14.7692 | 70.0008 |
| 58.6298 | −10.6360 | 70.0008 | 56.0736 | −15.4521 | 70.0008 |
| 59.1152 | −11.5960 | 70.0008 | 56.5371 | −16.1378 | 70.0008 |
| 59.5952 | −12.5614 | 70.0008 | 56.9951 | −16.8262 | 70.0008 |
| 60.0697 | −13.5268 | 70.0008 | 57.4477 | −17.5201 | 70.0008 |
| 60.5359 | −14.4977 | 70.0008 | 57.8947 | −18.2167 | 70.0008 |
| 61.0022 | −15.4686 | 70.0008 | 58.3336 | −18.9161 | 70.0008 |
| 61.4602 | −16.4450 | 70.0008 | 58.7669 | −19.6237 | 70.0008 |
| 61.9182 | −17.4214 | 70.0008 | 59.1893 | −20.3368 | 70.0008 |
| 62.3680 | −18.4005 | 70.0008 | 59.6034 | −21.0526 | 70.0008 |
| 62.8151 | −19.3796 | 70.0008 | 60.0093 | −21.7740 | 70.0008 |
| 63.2539 | −20.3642 | 70.0008 | 60.4098 | −22.5008 | 70.0008 |
| 63.6900 | −21.3461 | 70.0008 | 60.8020 | −23.2303 | 70.0008 |
| 64.1261 | −22.3307 | 70.0008 | 61.1942 | −23.9626 | 70.0008 |
| 64.5676 | −23.3126 | 70.0008 | 61.5809 | −24.6949 | 70.0008 |
| 65.0174 | −24.2917 | 70.0008 | 61.9648 | −25.4272 | 70.0008 |
| 65.4837 | −25.2654 | 70.0008 | 62.3406 | −26.1677 | 70.0008 |
| 65.9389 | −26.2445 | 70.0008 | 62.6999 | −26.9137 | 70.0008 |
| 66.1241 | −26.7478 | 70.0008 | 63.0674 | −27.6542 | 70.0008 |
| 66.3092 | −27.2510 | 70.0008 | 63.5227 | −28.3344 | 70.0008 |
| 66.4162 | −27.9285 | 70.0008 | 64.1398 | −28.8911 | 70.0008 |
| 66.2050 | −28.5922 | 70.0008 | 64.9022 | −29.1983 | 70.0008 |
| 65.7141 | −29.0694 | 70.0008 | 65.7141 | −29.0694 | 70.0008 |
| 5.1013 | 14.1219 | 80.0005 | 5.1013 | 14.1219 | 80.0005 |
| 4.4349 | 14.9393 | 80.0005 | 5.5210 | 13.8093 | 80.0005 |
| 4.0893 | 15.9321 | 80.0005 | 5.9845 | 13.5597 | 80.0005 |
| 4.0756 | 16.9880 | 80.0005 | 6.2299 | 13.4678 | 80.0005 |
| 4.2977 | 18.0165 | 80.0005 | 6.4754 | 13.3759 | 80.0005 |
| 4.6433 | 19.0121 | 80.0005 | 7.2708 | 13.2169 | 80.0005 |
| 5.0629 | 19.9830 | 80.0005 | 8.0826 | 13.1949 | 80.0005 |
| 5.5457 | 20.9182 | 80.0005 | 8.8944 | 13.2717 | 80.0005 |
| 6.0969 | 21.8096 | 80.0005 | 9.6980 | 13.3979 | 80.0005 |
| 6.7085 | 22.6543 | 80.0005 | 10.4989 | 13.5487 | 80.0005 |
| 7.3695 | 23.4497 | 80.0005 | 11.2970 | 13.7078 | 80.0005 |
| 8.0881 | 24.2039 | 80.0005 | 12.0924 | 13.8696 | 80.0005 |
| 8.8560 | 24.9198 | 80.0005 | 12.8905 | 14.0259 | 80.0005 |
| 9.6679 | 25.5835 | 80.0005 | 13.6913 | 14.1658 | 80.0005 |
| 10.5181 | 26.1951 | 80.0005 | 14.4977 | 14.2810 | 80.0005 |
| 11.3957 | 26.7546 | 80.0005 | 15.3068 | 14.3523 | 80.0005 |
| 12.3090 | 27.2565 | 80.0005 | 16.1186 | 14.3825 | 80.0005 |
| 13.2553 | 27.7063 | 80.0005 | 16.9304 | 14.3743 | 80.0005 |
| 14.2316 | 28.0958 | 80.0005 | 17.7450 | 14.3276 | 80.0005 |
| 15.2272 | 28.4249 | 80.0005 | 18.5541 | 14.2563 | 80.0005 |
| 16.2310 | 28.6882 | 80.0005 | 19.3604 | 14.1549 | 80.0005 |
| 17.2486 | 28.8884 | 80.0005 | 20.1640 | 14.0259 | 80.0005 |
| 18.2853 | 29.0228 | 80.0005 | 20.9621 | 13.8724 | 80.0005 |
| 19.3330 | 29.0886 | 80.0005 | 21.7548 | 13.6941 | 80.0005 |
| 20.3807 | 29.0886 | 80.0005 | 22.5419 | 13.4911 | 80.0005 |
| 21.4256 | 29.0228 | 80.0005 | 23.3236 | 13.2635 | 80.0005 |
| 22.4596 | 28.8966 | 80.0005 | 24.0970 | 13.0139 | 80.0005 |
| 23.4826 | 28.7074 | 80.0005 | 24.8622 | 12.7424 | 80.0005 |
| 24.4974 | 28.4605 | 80.0005 | 25.6219 | 12.4489 | 80.0005 |
| 25.5040 | 28.1534 | 80.0005 | 26.3734 | 12.1363 | 80.0005 |
| 26.4886 | 27.7941 | 80.0005 | 27.1139 | 11.8071 | 80.0005 |
| 27.4512 | 27.3882 | 80.0005 | 27.8489 | 11.4588 | 80.0005 |
| 28.3892 | 26.9384 | 80.0005 | 28.5757 | 11.0913 | 80.0005 |
| 29.3025 | 26.4474 | 80.0005 | 29.2943 | 10.7101 | 80.0005 |
| 30.2021 | 25.9154 | 80.0005 | 30.0047 | 10.3151 | 80.0005 |
| 31.0798 | 25.3476 | 80.0005 | 30.7068 | 9.9037 | 80.0005 |
| 31.9382 | 24.7470 | 80.0005 | 31.3979 | 9.4786 | 80.0005 |

TABLE I-continued

| SUCTION SIDE | | | PRESSURE SIDE | | |
|---|---|---|---|---|---|
| X (%) | Y (%) | Z (%) | X (%) | Y (%) | Z (%) |
| 32.7747 | 24.1162 | 80.0005 | 32.0836 | 9.0398 | 80.0005 |
| 33.5893 | 23.4607 | 80.0005 | 32.7638 | 8.5927 | 80.0005 |
| 34.3847 | 22.7860 | 80.0005 | 33.4330 | 8.1320 | 80.0005 |
| 35.1581 | 22.0894 | 80.0005 | 34.0967 | 7.6602 | 80.0005 |
| 35.9151 | 21.3735 | 80.0005 | 34.7522 | 7.1803 | 80.0005 |
| 36.6583 | 20.6412 | 80.0005 | 35.3995 | 6.6893 | 80.0005 |
| 37.3852 | 19.8925 | 80.0005 | 36.0412 | 6.1902 | 80.0005 |
| 38.0982 | 19.1273 | 80.0005 | 36.6775 | 5.6828 | 80.0005 |
| 38.7976 | 18.3511 | 80.0005 | 37.3056 | 5.1672 | 80.0005 |
| 39.4833 | 17.5612 | 80.0005 | 37.9282 | 4.6433 | 80.0005 |
| 40.1580 | 16.7631 | 80.0005 | 38.5426 | 4.1112 | 80.0005 |
| 40.8217 | 15.9540 | 80.0005 | 39.1542 | 3.5737 | 80.0005 |
| 41.4717 | 15.1395 | 80.0005 | 39.7575 | 3.0306 | 80.0005 |
| 42.1135 | 14.3139 | 80.0005 | 40.3554 | 2.4766 | 80.0005 |
| 42.7443 | 13.4856 | 80.0005 | 40.9451 | 1.9199 | 80.0005 |
| 43.3669 | 12.6491 | 80.0005 | 41.5320 | 1.3549 | 80.0005 |
| 43.9812 | 11.8071 | 80.0005 | 42.1107 | 0.7844 | 80.0005 |
| 44.5901 | 10.9597 | 80.0005 | 42.6840 | 0.2084 | 80.0005 |
| 45.1908 | 10.1067 | 80.0005 | 43.2517 | −0.3730 | 80.0005 |
| 45.7832 | 9.2510 | 80.0005 | 43.8139 | −0.9599 | 80.0005 |
| 46.3728 | 8.3898 | 80.0005 | 44.3707 | −1.5523 | 80.0005 |
| 46.9570 | 7.5258 | 80.0005 | 44.9220 | −2.1502 | 80.0005 |
| 47.5357 | 6.6564 | 80.0005 | 45.4705 | −2.7509 | 80.0005 |
| 48.1089 | 5.7843 | 80.0005 | 46.0108 | −3.3598 | 80.0005 |
| 48.6767 | 4.9094 | 80.0005 | 46.5484 | −3.9686 | 80.0005 |
| 49.2389 | 4.0290 | 80.0005 | 47.0777 | −4.5857 | 80.0005 |
| 49.7957 | 3.1458 | 80.0005 | 47.6043 | −5.2056 | 80.0005 |
| 50.3469 | 2.2599 | 80.0005 | 48.1254 | −5.8309 | 80.0005 |
| 50.8927 | 1.3686 | 80.0005 | 48.6410 | −6.4590 | 80.0005 |
| 51.4358 | 0.4745 | 80.0005 | 49.1511 | −7.0925 | 80.0005 |
| 51.9733 | −0.4196 | 80.0005 | 49.6558 | −7.7288 | 80.0005 |
| 52.5054 | −1.3192 | 80.0005 | 50.1577 | −8.3678 | 80.0005 |
| 53.0320 | −2.2188 | 80.0005 | 50.6541 | −9.0124 | 80.0005 |
| 53.5559 | −3.1239 | 80.0005 | 51.1451 | −9.6596 | 80.0005 |
| 54.0742 | −4.0290 | 80.0005 | 51.6333 | −10.3124 | 80.0005 |
| 54.5898 | −4.9368 | 80.0005 | 52.1132 | −10.9651 | 80.0005 |
| 55.1000 | −5.8473 | 80.0005 | 52.5932 | −11.6234 | 80.0005 |
| 55.6046 | −6.7606 | 80.0005 | 53.0649 | −12.2844 | 80.0005 |
| 56.1038 | −7.6767 | 80.0005 | 53.5339 | −12.9481 | 80.0005 |
| 56.5975 | −8.5982 | 80.0005 | 54.0002 | −13.6145 | 80.0005 |
| 57.0857 | −9.5198 | 80.0005 | 54.4637 | −14.2838 | 80.0005 |
| 57.5684 | −10.4468 | 80.0005 | 54.9244 | −14.9557 | 80.0005 |
| 58.0483 | −11.3738 | 80.0005 | 55.3825 | −15.6277 | 80.0005 |
| 58.5201 | −12.3063 | 80.0005 | 55.8377 | −16.2996 | 80.0005 |
| 58.9863 | −13.2415 | 80.0005 | 56.2903 | −16.9743 | 80.0005 |
| 59.4471 | −14.1795 | 80.0005 | 56.7401 | −17.6517 | 80.0005 |
| 59.9051 | −15.1175 | 80.0005 | 57.1789 | −18.3347 | 80.0005 |
| 60.3576 | −16.0583 | 80.0005 | 57.6122 | −19.0231 | 80.0005 |
| 60.8074 | −17.0017 | 80.0005 | 58.0374 | −19.7170 | 80.0005 |
| 61.2517 | −17.9479 | 80.0005 | 58.4515 | −20.4191 | 80.0005 |
| 61.6961 | −18.8942 | 80.0005 | 58.8602 | −21.1212 | 80.0005 |
| 62.1349 | −19.8404 | 80.0005 | 59.2606 | −21.8288 | 80.0005 |
| 62.5737 | −20.7893 | 80.0005 | 59.6583 | −22.5392 | 80.0005 |
| 63.0153 | −21.7356 | 80.0005 | 60.0477 | −23.2495 | 80.0005 |
| 63.4568 | −22.6818 | 80.0005 | 60.4372 | −23.9626 | 80.0005 |
| 63.9066 | −23.6252 | 80.0005 | 60.8184 | −24.6784 | 80.0005 |
| 64.3592 | −24.5660 | 80.0005 | 61.1996 | −25.3997 | 80.0005 |
| 64.7980 | −25.5149 | 80.0005 | 61.5809 | −26.1238 | 80.0005 |
| 64.9831 | −26.0031 | 80.0005 | 61.9868 | −26.8369 | 80.0005 |
| 65.1683 | −26.4913 | 80.0005 | 62.4585 | −27.5034 | 80.0005 |
| 65.2670 | −27.1496 | 80.0005 | 63.0509 | −28.0656 | 80.0005 |
| 65.0394 | −27.7913 | 80.0005 | 63.7969 | −28.3728 | 80.0005 |
| 64.5676 | −28.2548 | 80.0005 | 64.5676 | −28.2548 | 80.0005 |
| 5.2193 | 18.0165 | 90.0003 | 5.2193 | 18.0165 | 90.0003 |
| 4.8024 | 18.5239 | 90.0003 | 5.6170 | 17.6874 | 90.0003 |
| 4.5144 | 19.1163 | 90.0003 | 6.0613 | 17.4131 | 90.0003 |
| 4.4486 | 19.4372 | 90.0003 | 6.2985 | 17.3062 | 90.0003 |
| 4.3828 | 19.7581 | 90.0003 | 6.5358 | 17.1992 | 90.0003 |
| 4.4733 | 20.7619 | 90.0003 | 7.3092 | 16.9853 | 90.0003 |
| 4.8051 | 21.7218 | 90.0003 | 8.1046 | 16.8783 | 90.0003 |
| 5.2604 | 22.6297 | 90.0003 | 8.9081 | 16.8399 | 90.0003 |
| 5.7897 | 23.4936 | 90.0003 | 9.7117 | 16.8344 | 90.0003 |
| 6.3794 | 24.3137 | 90.0003 | 10.5153 | 16.8427 | 90.0003 |
| 7.0349 | 25.0898 | 90.0003 | 11.3217 | 16.8509 | 90.0003 |
| 7.7425 | 25.8084 | 90.0003 | 12.1253 | 16.8481 | 90.0003 |
| 8.4967 | 26.4721 | 90.0003 | 12.9289 | 16.8289 | 90.0003 |
| 9.2921 | 27.0782 | 90.0003 | 13.7297 | 16.7878 | 90.0003 |
| 10.1286 | 27.6295 | 90.0003 | 14.5306 | 16.7192 | 90.0003 |
| 11.0090 | 28.1259 | 90.0003 | 15.3287 | 16.6205 | 90.0003 |
| 11.9223 | 28.5620 | 90.0003 | 16.1213 | 16.4971 | 90.0003 |
| 12.8548 | 28.9378 | 90.0003 | 16.9112 | 16.3435 | 90.0003 |
| 13.8038 | 29.2504 | 90.0003 | 17.6956 | 16.1652 | 90.0003 |
| 14.7719 | 29.5028 | 90.0003 | 18.4718 | 15.9650 | 90.0003 |
| 15.7593 | 29.6975 | 90.0003 | 19.2452 | 15.7401 | 90.0003 |
| 16.7631 | 29.8264 | 90.0003 | 20.0104 | 15.4933 | 90.0003 |
| 17.7697 | 29.8977 | 90.0003 | 20.7674 | 15.2300 | 90.0003 |
| 18.7762 | 29.9059 | 90.0003 | 21.5216 | 14.9475 | 90.0003 |
| 19.7718 | 29.8511 | 90.0003 | 22.2676 | 14.6458 | 90.0003 |
| 20.7674 | 29.7386 | 90.0003 | 23.0081 | 14.3331 | 90.0003 |
| 21.7602 | 29.5658 | 90.0003 | 23.7404 | 14.0013 | 90.0003 |
| 22.7476 | 29.3382 | 90.0003 | 24.4672 | 13.6584 | 90.0003 |
| 23.7185 | 29.0584 | 90.0003 | 25.1858 | 13.2991 | 90.0003 |
| 24.6784 | 28.7266 | 90.0003 | 25.8989 | 12.9289 | 90.0003 |
| 25.6164 | 28.3508 | 90.0003 | 26.6065 | 12.5477 | 90.0003 |
| 26.5352 | 27.9312 | 90.0003 | 27.3059 | 12.1500 | 90.0003 |
| 27.4321 | 27.4732 | 90.0003 | 27.9970 | 11.7441 | 90.0003 |
| 28.3070 | 26.9795 | 90.0003 | 28.6827 | 11.3244 | 90.0003 |
| 29.1599 | 26.4529 | 90.0003 | 29.3629 | 10.8966 | 90.0003 |
| 29.9964 | 25.8962 | 90.0003 | 30.0348 | 10.4550 | 90.0003 |
| 30.8165 | 25.3092 | 90.0003 | 30.7013 | 10.0052 | 90.0003 |
| 31.6173 | 24.6949 | 90.0003 | 31.3595 | 9.5444 | 90.0003 |
| 32.3990 | 24.0613 | 90.0003 | 32.0123 | 9.0782 | 90.0003 |
| 33.1642 | 23.4031 | 90.0003 | 32.6596 | 8.6010 | 90.0003 |
| 33.9075 | 22.7284 | 90.0003 | 33.3013 | 8.1155 | 90.0003 |
| 34.6343 | 22.0372 | 90.0003 | 33.9349 | 7.6218 | 90.0003 |
| 35.3474 | 21.3324 | 90.0003 | 34.5657 | 7.1199 | 90.0003 |
| 36.0440 | 20.6138 | 90.0003 | 35.1883 | 6.6125 | 90.0003 |
| 36.7269 | 19.8815 | 90.0003 | 35.8054 | 6.0997 | 90.0003 |
| 37.3989 | 19.1383 | 90.0003 | 36.4170 | 5.5786 | 90.0003 |
| 38.0571 | 18.3840 | 90.0003 | 37.0231 | 5.0520 | 90.0003 |
| 38.7099 | 17.6216 | 90.0003 | 37.6265 | 4.5199 | 90.0003 |
| 39.3489 | 16.8481 | 90.0003 | 38.2217 | 3.9796 | 90.0003 |
| 39.9797 | 16.0665 | 90.0003 | 38.8113 | 3.4338 | 90.0003 |
| 40.6023 | 15.2766 | 90.0003 | 39.3983 | 2.8853 | 90.0003 |
| 41.2166 | 14.4812 | 90.0003 | 39.9770 | 2.3285 | 90.0003 |
| 41.8228 | 13.6776 | 90.0003 | 40.5529 | 1.7663 | 90.0003 |
| 42.4207 | 12.8685 | 90.0003 | 41.1206 | 1.1985 | 90.0003 |
| 43.0103 | 12.0540 | 90.0003 | 41.6856 | 0.6281 | 90.0003 |
| 43.5945 | 11.2339 | 90.0003 | 42.2451 | 0.0494 | 90.0003 |
| 44.1732 | 10.4111 | 90.0003 | 42.7992 | −0.5321 | 90.0003 |
| 44.7437 | 9.5856 | 90.0003 | 43.3504 | −1.1163 | 90.0003 |
| 45.3114 | 8.7546 | 90.0003 | 43.8962 | −1.7087 | 90.0003 |
| 45.8737 | 7.9208 | 90.0003 | 44.4365 | −2.3038 | 90.0003 |
| 46.4304 | 7.0815 | 90.0003 | 44.9713 | −2.9017 | 90.0003 |
| 46.9844 | 6.2423 | 90.0003 | 45.5034 | −3.5051 | 90.0003 |
| 47.5302 | 5.3975 | 90.0003 | 46.0273 | −4.1140 | 90.0003 |
| 48.0733 | 4.5528 | 90.0003 | 46.5511 | −4.7256 | 90.0003 |
| 48.6108 | 3.7026 | 90.0003 | 47.0667 | −5.3400 | 90.0003 |
| 49.1457 | 2.8496 | 90.0003 | 47.5796 | −5.9598 | 90.0003 |
| 49.6750 | 1.9939 | 90.0003 | 48.0870 | −6.5824 | 90.0003 |
| 50.1988 | 1.1382 | 90.0003 | 48.5889 | −7.2104 | 90.0003 |
| 50.7172 | 0.2770 | 90.0003 | 49.0853 | −7.8413 | 90.0003 |
| 51.2328 | −0.5842 | 90.0003 | 49.5790 | −8.4748 | 90.0003 |
| 51.7457 | −1.4481 | 90.0003 | 50.0699 | −9.1111 | 90.0003 |
| 52.2531 | −2.3175 | 90.0003 | 50.5526 | −9.7529 | 90.0003 |
| 52.7577 | −3.1842 | 90.0003 | 51.0354 | −10.3974 | 90.0003 |
| 53.2569 | −4.0564 | 90.0003 | 51.5126 | −11.0447 | 90.0003 |
| 53.7506 | −4.9313 | 90.0003 | 51.9843 | −11.6947 | 90.0003 |
| 54.2443 | −5.8062 | 90.0003 | 52.4560 | −12.3447 | 90.0003 |
| 54.7297 | −6.6866 | 90.0003 | 52.9223 | −13.0002 | 90.0003 |
| 55.2124 | −7.5670 | 90.0003 | 53.3858 | −13.6557 | 90.0003 |
| 55.6896 | −8.4529 | 90.0003 | 53.8466 | −14.3139 | 90.0003 |
| 56.1641 | −9.3387 | 90.0003 | 54.3046 | −14.9749 | 90.0003 |
| 56.6331 | −10.2274 | 90.0003 | 54.7571 | −15.6386 | 90.0003 |
| 57.0966 | −11.1187 | 90.0003 | 55.2069 | −16.3024 | 90.0003 |
| 57.5574 | −12.0128 | 90.0003 | 55.6540 | −16.9716 | 90.0003 |
| 58.0127 | −12.9097 | 90.0003 | 56.0956 | −17.6435 | 90.0003 |
| 58.4625 | −13.8093 | 90.0003 | 56.5344 | −18.3155 | 90.0003 |
| 58.9095 | −14.7116 | 90.0003 | 56.9677 | −18.9956 | 90.0003 |
| 59.3511 | −15.6139 | 90.0003 | 57.3928 | −19.6758 | 90.0003 |
| 59.7899 | −16.5218 | 90.0003 | 57.8097 | −20.3615 | 90.0003 |
| 60.2260 | −17.4268 | 90.0003 | 58.2184 | −21.0526 | 90.0003 |

TABLE I-continued

| SUCTION SIDE | | | PRESSURE SIDE | | |
|---|---|---|---|---|---|
| X (%) | Y (%) | Z (%) | X (%) | Y (%) | Z (%) |
| 60.6593 | −18.3374 | 90.0003 | 58.6188 | −21.7493 | 90.0003 |
| 61.0899 | −19.2452 | 90.0003 | 59.0110 | −22.4514 | 90.0003 |
| 61.5233 | −20.1530 | 90.0003 | 59.3950 | −23.1590 | 90.0003 |
| 61.9566 | −21.0609 | 90.0003 | 59.7735 | −23.8666 | 90.0003 |
| 62.3982 | −21.9659 | 90.0003 | 60.1519 | −24.5769 | 90.0003 |
| 62.8425 | −22.8683 | 90.0003 | 60.5387 | −25.2846 | 90.0003 |
| 63.2895 | −23.7706 | 90.0003 | 60.9473 | −25.9839 | 90.0003 |
| 63.7119 | −24.6812 | 90.0003 | 61.4081 | −26.6504 | 90.0003 |
| 64.0712 | −25.6219 | 90.0003 | 61.9923 | −27.2072 | 90.0003 |
| 64.1096 | −26.6065 | 90.0003 | 62.7328 | −27.5061 | 90.0003 |
| 63.4898 | −27.3827 | 90.0003 | 63.4898 | −27.3827 | 90.0003 |
| 5.3070 | 22.9505 | 100.0000 | 5.3070 | 22.9505 | 100.0000 |
| 4.9560 | 23.4799 | 100.0000 | 5.6691 | 22.5830 | 100.0000 |
| 4.7530 | 24.0833 | 100.0000 | 6.0832 | 22.2676 | 100.0000 |
| 4.7448 | 24.4014 | 100.0000 | 6.3081 | 22.1319 | 100.0000 |
| 4.7366 | 24.7196 | 100.0000 | 6.5330 | 21.9961 | 100.0000 |
| 5.0328 | 25.6548 | 100.0000 | 7.2598 | 21.6478 | 100.0000 |
| 5.5347 | 26.5050 | 100.0000 | 8.0168 | 21.3735 | 100.0000 |
| 6.1518 | 27.2702 | 100.0000 | 8.7902 | 21.1486 | 100.0000 |
| 6.8457 | 27.9614 | 100.0000 | 9.5691 | 20.9512 | 100.0000 |
| 7.5862 | 28.6032 | 100.0000 | 10.3535 | 20.7592 | 100.0000 |
| 8.3678 | 29.1928 | 100.0000 | 11.1324 | 20.5535 | 100.0000 |
| 9.1934 | 29.7194 | 100.0000 | 11.9031 | 20.3286 | 100.0000 |
| 10.0518 | 30.1747 | 100.0000 | 12.6711 | 20.0817 | 100.0000 |
| 10.9322 | 30.5669 | 100.0000 | 13.4280 | 19.8130 | 100.0000 |
| 11.8455 | 30.8933 | 100.0000 | 14.1823 | 19.5250 | 100.0000 |
| 12.7863 | 31.1566 | 100.0000 | 14.9283 | 19.2205 | 100.0000 |
| 13.7435 | 31.3540 | 100.0000 | 15.6715 | 18.9079 | 100.0000 |
| 14.7089 | 31.4884 | 100.0000 | 16.4093 | 18.5815 | 100.0000 |
| 15.6770 | 31.5570 | 100.0000 | 17.1416 | 18.2496 | 100.0000 |
| 16.6479 | 31.5652 | 100.0000 | 17.8711 | 17.9095 | 100.0000 |
| 17.6216 | 31.5131 | 100.0000 | 18.5980 | 17.5585 | 100.0000 |
| 18.5925 | 31.4007 | 100.0000 | 19.3165 | 17.1992 | 100.0000 |
| 19.5551 | 31.2334 | 100.0000 | 20.0324 | 16.8317 | 100.0000 |
| 20.4986 | 31.0140 | 100.0000 | 20.7427 | 16.4532 | 100.0000 |
| 21.4284 | 30.7479 | 100.0000 | 21.4476 | 16.0637 | 100.0000 |
| 22.3444 | 30.4325 | 100.0000 | 22.1470 | 15.6661 | 100.0000 |
| 23.2495 | 30.0732 | 100.0000 | 22.8408 | 15.2601 | 100.0000 |
| 24.1409 | 29.6728 | 100.0000 | 23.5320 | 14.8433 | 100.0000 |
| 25.0130 | 29.2340 | 100.0000 | 24.2149 | 14.4181 | 100.0000 |
| 25.8660 | 28.7622 | 100.0000 | 24.8951 | 13.9848 | 100.0000 |
| 26.6970 | 28.2603 | 100.0000 | 25.5725 | 13.5460 | 100.0000 |
| 27.5088 | 27.7310 | 100.0000 | 26.2417 | 13.0989 | 100.0000 |
| 28.3070 | 27.1770 | 100.0000 | 26.9082 | 12.6464 | 100.0000 |
| 29.0886 | 26.5955 | 100.0000 | 27.5719 | 12.1884 | 100.0000 |
| 29.8538 | 25.9949 | 100.0000 | 28.2302 | 11.7249 | 100.0000 |
| 30.6053 | 25.3723 | 100.0000 | 28.8829 | 11.2559 | 100.0000 |
| 31.3431 | 24.7360 | 100.0000 | 29.5329 | 10.7814 | 100.0000 |
| 32.0644 | 24.0833 | 100.0000 | 30.1802 | 10.3014 | 100.0000 |
| 32.7720 | 23.4195 | 100.0000 | 30.8192 | 9.8132 | 100.0000 |
| 33.4632 | 22.7421 | 100.0000 | 31.4555 | 9.3195 | 100.0000 |
| 34.1406 | 22.0510 | 100.0000 | 32.0891 | 8.8231 | 100.0000 |
| 34.8098 | 21.3516 | 100.0000 | 32.7171 | 8.3185 | 100.0000 |
| 35.4653 | 20.6385 | 100.0000 | 33.3397 | 7.8056 | 100.0000 |
| 36.1098 | 19.9172 | 100.0000 | 33.9568 | 7.2900 | 100.0000 |
| 36.7434 | 19.1876 | 100.0000 | 34.5712 | 6.7689 | 100.0000 |
| 37.3714 | 18.4499 | 100.0000 | 35.1801 | 6.2423 | 100.0000 |
| 37.9913 | 17.7038 | 100.0000 | 35.7834 | 5.7102 | 100.0000 |
| 38.6001 | 16.9524 | 100.0000 | 36.3841 | 5.1727 | 100.0000 |
| 39.2035 | 16.1926 | 100.0000 | 36.9820 | 4.6296 | 100.0000 |
| 39.8014 | 15.4274 | 100.0000 | 37.5717 | 4.0838 | 100.0000 |
| 40.3911 | 14.6540 | 100.0000 | 38.1586 | 3.5325 | 100.0000 |
| 40.9753 | 13.8778 | 100.0000 | 38.7428 | 2.9758 | 100.0000 |
| 41.5512 | 13.0962 | 100.0000 | 39.3215 | 2.4163 | 100.0000 |
| 42.1245 | 12.3118 | 100.0000 | 39.8947 | 1.8513 | 100.0000 |
| 42.6894 | 11.5219 | 100.0000 | 40.4652 | 1.2836 | 100.0000 |
| 43.2490 | 10.7265 | 100.0000 | 41.0301 | 0.7103 | 100.0000 |
| 43.8030 | 9.9312 | 100.0000 | 41.5896 | 0.1316 | 100.0000 |
| 44.3515 | 9.1303 | 100.0000 | 42.1464 | −0.4498 | 100.0000 |
| 44.8945 | 8.3240 | 100.0000 | 42.6977 | −1.0367 | 100.0000 |
| 45.4348 | 7.5176 | 100.0000 | 43.2462 | −1.6264 | 100.0000 |
| 45.9697 | 6.7058 | 100.0000 | 43.7865 | −2.2216 | 100.0000 |
| 46.4990 | 5.8940 | 100.0000 | 44.3268 | −2.8222 | 100.0000 |
| 47.0228 | 5.0767 | 100.0000 | 44.8589 | −3.4256 | 100.0000 |
| 47.5440 | 4.2566 | 100.0000 | 45.3882 | −4.0317 | 100.0000 |
| 48.0623 | 3.4338 | 100.0000 | 45.9121 | −4.6433 | 100.0000 |
| 48.5752 | 2.6083 | 100.0000 | 46.4332 | −5.2577 | 100.0000 |
| 49.0853 | 1.7827 | 100.0000 | 46.9488 | −5.8775 | 100.0000 |
| 49.5900 | 0.9517 | 100.0000 | 47.4589 | −6.5001 | 100.0000 |
| 50.0919 | 0.1207 | 100.0000 | 47.9663 | −7.1254 | 100.0000 |
| 50.5883 | −0.7131 | 100.0000 | 48.4682 | −7.7562 | 100.0000 |
| 51.0820 | −1.5496 | 100.0000 | 48.9674 | −8.3870 | 100.0000 |
| 51.5729 | −2.3889 | 100.0000 | 49.4583 | −9.0233 | 100.0000 |
| 52.0584 | −3.2281 | 100.0000 | 49.9493 | −9.6624 | 100.0000 |
| 52.5411 | −4.0728 | 100.0000 | 50.4347 | −10.3069 | 100.0000 |
| 53.0210 | −4.9176 | 100.0000 | 50.9147 | −10.9514 | 100.0000 |
| 53.4955 | −5.7651 | 100.0000 | 51.3919 | −11.6014 | 100.0000 |
| 53.9673 | −6.6125 | 100.0000 | 51.8636 | −12.2514 | 100.0000 |
| 54.4362 | −7.4655 | 100.0000 | 52.3354 | −12.9069 | 100.0000 |
| 54.8998 | −8.3185 | 100.0000 | 52.8016 | −13.5624 | 100.0000 |
| 55.3605 | −9.1742 | 100.0000 | 53.2651 | −14.2234 | 100.0000 |
| 55.8158 | −10.0326 | 100.0000 | 53.7259 | −14.8844 | 100.0000 |
| 56.2683 | −10.8911 | 100.0000 | 54.1812 | −15.5454 | 100.0000 |
| 56.7181 | −11.7523 | 100.0000 | 54.6365 | −16.2118 | 100.0000 |
| 57.1624 | −12.6162 | 100.0000 | 55.0835 | −16.8811 | 100.0000 |
| 57.6013 | −13.4829 | 100.0000 | 55.5306 | −17.5503 | 100.0000 |
| 58.0374 | −14.3496 | 100.0000 | 55.9694 | −18.2250 | 100.0000 |
| 58.4707 | −15.2190 | 100.0000 | 56.4027 | −18.9024 | 100.0000 |
| 58.8985 | −16.0912 | 100.0000 | 56.8306 | −19.5853 | 100.0000 |
| 59.3237 | −16.9633 | 100.0000 | 57.2502 | −20.2737 | 100.0000 |
| 59.7488 | −17.8382 | 100.0000 | 57.6616 | −20.9676 | 100.0000 |
| 60.1739 | −18.7131 | 100.0000 | 58.0620 | −21.6642 | 100.0000 |
| 60.5990 | −19.5881 | 100.0000 | 58.4515 | −22.3691 | 100.0000 |
| 61.0269 | −20.4602 | 100.0000 | 58.8300 | −23.0795 | 100.0000 |
| 61.4602 | −21.3269 | 100.0000 | 59.1975 | −23.7980 | 100.0000 |
| 61.8990 | −22.1936 | 100.0000 | 59.5650 | −24.5139 | 100.0000 |
| 62.3324 | −23.0603 | 100.0000 | 59.9545 | −25.2270 | 100.0000 |
| 62.7465 | −23.9406 | 100.0000 | 60.4125 | −25.8989 | 100.0000 |
| 63.0948 | −24.8512 | 100.0000 | 61.0049 | −26.4420 | 100.0000 |
| 63.1058 | −25.8029 | 100.0000 | 61.7537 | −26.7052 | 100.0000 |
| 62.5161 | −26.5544 | 100.0000 | 62.5161 | −26.5544 | 100.0000 |

It will also be appreciated that the airfoil 52 disclosed in the above Table I may be scaled up or down geometrically for use in other similar turbine designs. Consequently, the coordinate values set forth in Table I may be scaled upwardly or downwardly such that the airfoil profile shape remains unchanged. A scaled version of the coordinates in Table I would be represented by X, Y and Z coordinate values of Table I, with the X, Y and Z non-dimensional coordinate values converted to inches, multiplied or divided by a constant number.

An important term in this disclosure is "profile". The profile is the range of the variation between measured points on an airfoil surface and the ideal position listed in Table I. The actual profile on a manufactured turbine rotor blade will be different than those in Table I and the design is robust to this variation meaning that mechanical and aerodynamic function are not impaired. As noted above, a + or −5% profile tolerance is used herein. The X, Y and Z values are all non-dimensionalized relative to the airfoil height.

The disclosed airfoil shape optimizes and is specific to the machine conditions and specifications. It provides a unique profile to achieve 1) interaction between other stages in the turbine 10; 2) aerodynamic efficiency; and 3) normalized aerodynamic and mechanical rotor blade or airfoil loadings. The disclosed loci of points defined in Table I allow the gas turbine 12 or any other suitable turbine to run in an efficient, safe and smooth manner. As also noted, any scale of the disclosed airfoil 52 may be adopted as long as 1) interaction between other stages in the pressure turbine 10; 2) aerodynamic efficiency; and 3) normalized aerodynamic and mechanical blade loadings are maintained in the scaled turbine. The airfoil 52 described herein thus improves overall gas turbine 12 efficiency. Specifically, the airfoil 52 provides a desired turbine efficiency lapse rate (ISO, hot, cold, part load, etc.). The airfoil 52 also meets all aeromechanics and stress requirements. The turbine rotor blade 50 described herein has very specific aerodynamic design requirements. Significant cross-functional design effort was require to meet these design goals. The airfoil 52 of the rotor blade 50, thus, is of a specific shape to meet aerodynamic, mechanical, and heat transfer requirements in an efficient and cost effective manner.

Further, it should be understood that exemplary embodiments of the present disclosure may include the entirety of the nominal airfoil profile set forth in Table I or portions thereof. Such portions may include a portion of the pressure side (or "pressure side portion"), a portion of the suction side (or "suction side portion"), and portions of both the pressure side and suction side.

Thus, exemplary embodiments of the present disclosure include a turbine rotor blade having an airfoil that includes a pressure side portion of a nominal airfoil profile substantially in accordance with Cartesian coordinate values of X, Y, and Z of a pressure side as set forth in Table I. The Cartesian coordinate values of X, Y, and Z are non-dimensional values from 0% to 100% convertible to dimensional distances by multiplying the Cartesian coordinate values of X, Y and Z by a height of the airfoil defined along the Z axis. The X and Y values of the pressure side are coordinate values that, when connected by smooth continuing arcs, define pressure side sections of the pressure side portion of the nominal airfoil profile at each Z coordinate value. The pressure side sections may be joined smoothly with one another to form the pressure side portion.

Exemplary embodiments of the present disclosure also include a turbine rotor blade having an airfoil that includes a suction side portion of a nominal airfoil profile substantially in accordance with Cartesian coordinate values of X, Y, and Z of a suction side as set forth in Table I. The Cartesian coordinate values of X, Y, and Z are non-dimensional values from 0% to 100% convertible to dimensional distances by multiplying the Cartesian coordinate values of X, Y and Z by a height of the airfoil defined along the Z axis. The X and Y values of the suction side are coordinate values that, when connected by smooth continuing arcs, define suction side sections of the suction side portion of the nominal airfoil profile at each Z coordinate value. The suction side sections may be joined smoothly with one another to form the suction side portion.

Exemplary embodiment of the present disclosure also include a turbine engine that has an airfoil, wherein the airfoil includes: a pressure side portion of a nominal airfoil profile substantially in accordance with Cartesian coordinate values of X, Y, and Z of a pressure side as set forth in Table I; and a suction side portion of the nominal airfoil profile substantially in accordance with Cartesian coordinate values of X, Y, and Z of the suction side as set forth in Table I. The Cartesian coordinate values of X, Y, and Z are non-dimensional values from 0% to 100% convertible to dimensional distances by multiplying the Cartesian coordinate values of X, Y and Z by a height of the airfoil defined along the Z axis. The X and Y values of the pressure side are coordinate values that, when connected by smooth continuing arcs, define pressure side sections of the pressure side portion of the nominal airfoil profile at each Z coordinate value. The pressure side sections may be joined smoothly with one another to form the pressure side portion. The X and Y values of the suction side are coordinate values that, when connected by smooth continuing arcs, define suction side sections of the suction side portion of the nominal airfoil profile at each Z coordinate value. The suction side sections may be joined smoothly with one another to form the suction side portion.

A height of each of the suction side portion and pressure side portion may be defined along the Z axis. The height of each of the suction side portion and pressure side portion may be less than or equal to the height of the airfoil. According to exemplary embodiments, the height of the suction side portion and the height of the pressure side portion may be substantially the same. According to exemplary embodiments, the suction side portion and the pressure side portion may each start at a common distance relative to a base of the airfoil and extend toward a tip of the airfoil. According to exemplary embodiments, the height of the suction side portion and/or the height of the pressure side portion may each be equal to or greater than 50% of the height of the airfoil. According to other embodiments, the height of the suction side portion and/or the height of the pressure side portion may each be equal to or greater than 75% of the height of the airfoil. According to other embodiments, the height of the suction side portion and the height of the pressure side portion may each be equal to 100% of the height of the airfoil.

As already described, the turbine engine may include a combustion or gas turbine that has a compressor, combustor, and turbine. The airfoil of the present disclosure may be configured as the airfoil of a turbine rotor blade, i.e., a rotor blade within the turbine of the gas turbine. More specifically, the airfoil of the present disclosure may be the airfoil of a turbine rotor blade that is configured to function as a first stage rotor blade in the turbine. In such cases, the turbine includes a first stage that has a row of circumferentially spaced nozzles and a row of circumferentially spaced rotor blades, with the airfoil of the present disclosure being configured as the airfoil of each of the rotor blades within the first stage row of rotor blades.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A turbine rotor blade including an airfoil that comprises a pressure side portion of a nominal airfoil profile substantially in accordance with Cartesian coordinate values of X, Y, and Z of a pressure side as set forth in Table I, wherein:
    the Cartesian coordinate values of X, Y, and Z are non-dimensional values from 0% to 100% convertible to dimensional distances by multiplying the Cartesian coordinate values of X, Y and Z by a height of the airfoil defined along a Z axis;
    the X and Y values of the pressure side are coordinate values that, when connected by smooth continuing arcs, define pressure side sections of the pressure side portion of the nominal airfoil profile at each Z coordinate value; and
    the pressure side sections are joined smoothly with one another to form the pressure side portion.

2. The turbine rotor blade of claim 1, wherein the nominal airfoil profile lies in an envelope within +/−5% of a chord length in a direction normal to any of the pressure side sections.

3. The turbine rotor blade of claim 1, wherein a height of the pressure side portion is defined along the Z axis, and wherein the height of the pressure side portion is less than or equal to the height of the airfoil.

4. The turbine rotor blade of claim 3, wherein the height of the pressure side portion is equal to or greater than 50% of the height of the airfoil; and
wherein the height of the airfoil is between 3 and 10 inches.

5. The turbine rotor blade of claim 3, wherein the height of the pressure side portion is equal to or greater than 75% of the height of the airfoil; and
wherein the turbine rotor blade is configured to function as a first stage turbine rotor blade in a turbine.

6. The turbine rotor blade of claim 3, wherein the height of the pressure side portion is equal to 100% of the height of the airfoil.

7. A turbine rotor blade including an airfoil that comprises a suction side portion of a nominal airfoil profile substantially in accordance with Cartesian coordinate values of X, Y, and Z of a suction side as set forth in Table I, wherein:
the Cartesian coordinate values of X, Y, and Z are non-dimensional values from 0% to 100% convertible to dimensional distances by multiplying the Cartesian coordinate values of X, Y and Z by a height of the airfoil defined along a Z axis;
the X and Y values of the suction side are coordinate values that, when connected by smooth continuing arcs, define suction side sections of the suction side portion of the nominal airfoil profile at each Z coordinate value; and
the suction side sections are joined smoothly with one another to form the suction side portion.

8. The turbine rotor blade of claim 7, wherein the nominal airfoil profile lies in an envelope within +/−5% of a chord length in a direction normal to any of the suction side sections.

9. The turbine rotor blade of claim 7, wherein a height of the suction side portion is defined along the Z axis, and wherein the height of the suction side portion is less than or equal to the height of the airfoil.

10. The turbine rotor blade of claim 9, wherein the height of the suction side portion is equal to or greater than 50% of the height of the airfoil; and
wherein the height of the airfoil is between 3 and 10 inches.

11. The turbine rotor blade of claim 9, wherein the height of the suction side portion is equal to or greater than 75% of the height of the airfoil; and
wherein the turbine rotor blade is configured to function as a first stage turbine rotor blade in a turbine.

12. The turbine rotor blade of claim 9, wherein the height of the suction side portion is equal to 100% of the height of the airfoil.

13. A turbine engine that includes an airfoil that comprises:
a pressure side portion of a nominal airfoil profile substantially in accordance with Cartesian coordinate values of X, Y, and Z of a pressure side as set forth in Table I;
a suction side portion of the nominal airfoil profile substantially in accordance with Cartesian coordinate values of X, Y, and Z of the suction side as set forth in Table I
wherein:
the Cartesian coordinate values of X, Y, and Z are non-dimensional values from 0% to 100% convertible to dimensional distances by multiplying the Cartesian coordinate values of X, Y and Z by a height of the airfoil defined along a Z axis;
the X and Y values of the pressure side are coordinate values that, when connected by smooth continuing arcs, define pressure side sections of the pressure side portion of the nominal airfoil profile at each Z coordinate value, the pressure side sections being joined smoothly with one another to form the pressure side portion; and
the X and Y values of the suction side are coordinate values that, when connected by smooth continuing arcs, define suction side sections of the suction side portion of the nominal airfoil profile at each Z coordinate value, the suction side sections being joined smoothly with one another to form the suction side portion.

14. The turbine engine of claim 13, wherein the turbine engine comprises a gas turbine having a compressor, a combustor, and a turbine; and
wherein the airfoil comprises a rotor blade in the turbine.

15. The turbine engine of claim 14, wherein the rotor blade is a first stage rotor blade in the turbine.

16. The turbine engine of claim 14, wherein the nominal airfoil profile lies in an envelope within +/−20% of a thickness of a trailing edge of the airfoil in a direction normal to any of the suction side and pressure side sections; and
wherein:
a height of the suction side portion is defined along the Z axis, and wherein the height of the suction side portion is less than or equal to the height of the airfoil; and
a height of the pressure side portion is defined along the Z axis, and wherein the height of the pressure side portion is less than or equal to the height of the airfoil.

17. The turbine engine of claim 16, wherein the height of the suction side portion and the height of the pressure side portion are substantially the same;
wherein the height of the suction side portion and the height of the pressure side portion are each equal to or greater than 50% of the height of the airfoil; and
wherein the suction side portion and the pressure side portion start at a common distance relative to a base of the airfoil and extend toward a tip of the airfoil.

18. The turbine engine of claim 17, wherein the height of the suction side portion and the height of the pressure side portion are each equal to or greater than 75% of the height of the airfoil.

19. The turbine engine of claim 17, wherein the height of the suction side portion and the height of the pressure side portion are each equal to or greater than 100% of the height of the airfoil.

20. The turbine engine of claim 17, wherein the turbine comprises a first stage that includes a row of first stage nozzles adjacent to a row of first stage rotor blades; and
wherein a plurality of first stage rotor blades contained within the row of first stage rotor blades comprises the airfoil.

* * * * *